United States Patent
Besoli et al.

(10) Patent No.: US 11,700,052 B2
(45) Date of Patent: Jul. 11, 2023

(54) REPEATER DEVICE WITH MULTI-RANGE ANTENNA ARRAY AND METHOD OF OPERATION OF REPEATER DEVICE

(71) Applicant: Movandi Corporation, Irvine, CA (US)

(72) Inventors: Alfred Grau Besoli, Irvine, CA (US); Ahmadreza Rofougaran, Newport Beach, CA (US); Brima Ibrahim, Laguna Hills, CA (US); Farid Shirinfar, Granada Hills, CA (US); Maryam Rofougaran, Rancho Palos Verdes, CA (US); Nemat Dolatsha, San Jose, CA (US); Yifan Wang, South Brisbane (AU)

(73) Assignee: Movandi Corporation, Irvine, CA (US)

( * ) Notice: Subject to any disclaimer, the term of this patent is extended or adjusted under 35 U.S.C. 154(b) by 0 days.

(21) Appl. No.: 17/887,556

(22) Filed: Aug. 15, 2022

(65) Prior Publication Data
US 2022/0393758 A1    Dec. 8, 2022

Related U.S. Application Data

(63) Continuation of application No. 17/459,528, filed on Aug. 27, 2021, now Pat. No. 11,444,684.
(Continued)

(51) Int. Cl.
*H04L 5/12* (2006.01)
*H04B 7/155* (2006.01)
*H04B 7/06* (2006.01)

(52) U.S. Cl.
CPC ....... *H04B 7/15528* (2013.01); *H04B 7/0608* (2013.01); *H04B 7/0691* (2013.01); *H04B 7/0695* (2013.01)

(58) Field of Classification Search
CPC .............. H04B 7/15528; H04B 7/0608; H04B 7/0691; H04B 7/0695
(Continued)

(56) References Cited

U.S. PATENT DOCUMENTS

2020/0145093 A1* 5/2020 Cheng .................. H04B 7/1555

OTHER PUBLICATIONS

Corrected Notice of Allowance for U.S. Appl. No. 17/459,528 dated Aug. 3, 2022.
(Continued)

*Primary Examiner* — Zewdu A Kassa
(74) *Attorney, Agent, or Firm* — Chip Law Group

(57) ABSTRACT

A repeater device includes a first antenna array having a plurality of antenna configuration modes, where each mode defines a unique configuration of one or more sub-arrays of a plurality of different sub-arrays of the first antenna array. The repeater device further includes control circuitry configured to select one of the plurality of antenna configuration modes and based on the selected one of the plurality of antenna configuration modes, activate a first set of antenna elements of the first antenna array and deactivate a second set of antenna elements of the first antenna array. The first set of antenna elements corresponds to a first configuration of one or more sub-arrays of the first antenna array. A beam of RF signal is directed to a user equipment from the first configuration of the one or more sub-arrays of the first antenna array.

20 Claims, 14 Drawing Sheets

Related U.S. Application Data

(60) Provisional application No. 63/073,077, filed on Sep. 1, 2020, provisional application No. 63/070,927, filed on Aug. 27, 2020.

(58) Field of Classification Search
USPC ........ 375/262, 261, 260, 259, 219, 295, 316
See application file for complete search history.

(56) References Cited

OTHER PUBLICATIONS

Notice of Allowance for U.S. Appl. No. 17/459,528 dated Apr. 29, 2022.

* cited by examiner

REPEATER DEVICE WITH MULTI-RANGE ANTENNA ARRAY AND METHOD OF OPERATION OF REPEATER DEVICE

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 17/459,528 filed on Aug. 27, 2021, which claims priority to the U.S. Provisional Application Ser. No. 63/070,927 filed on Aug. 27, 2020, and further from U.S. Provisional Application Ser. No. 63/073,077 filed on Sep. 1, 2020.

Each of the above-referenced Applications is hereby incorporated herein by reference in their entirety.

FIELD OF TECHNOLOGY

Certain embodiments of the disclosure relate to communication systems. More specifically, certain embodiments of the disclosure relate to a repeater device with multi-range antenna array and a method of operation of the repeater device for high-performance communication.

BACKGROUND

Wireless telecommunication in modern times has witnessed the advent of various signal transmission techniques and methods, such as use of beam forming and beam steering techniques, for enhancing capacity of radio channels. In accordance with such techniques, a transmitter radiates radio waves in form of beams of radio frequency (RF) signals to a variety of RF receiver devices. The conventional systems which use techniques such as beamforming and beam steering for signal transmission may have one or more limitations. For example, a beam of RF signals transmitted by conventional systems may be highly directional in nature and may be limited in transmission range and/or coverage.

In certain scenarios, conventional repeater devices may be required to be deployed indoors; for example, they may be mounted under the ceiling (e.g., a ceiling unit) or may be mounted on a wall (e.g., a wall-mounted repeater device), and the like. Similarly, in certain other scenarios, some conventional repeater devices may be required to be deployed outdoors, for example, under a bridge or other areas where at one side of the conventional repeater device may have a signal obstructing object or surface. In such scenarios, the conventional repeater device may manifest several limitations, for example, inconsistent performance in terms of data throughput and signal quality provided to its connected users. For example, path loss significantly increases as the range of a destination device (e.g., an end-user device) increases with respect to the conventional repeater device (e.g., source), which then becomes a challenge to maintain a steady and efficient communication link from the conventional repeater device to the destination device without affecting Quality of Experience (QoE) for a user. Alternatively stated, a user may not have a consistent QoE from the conventional repeater device based on the current position of the user with respect to the conventional repeater device. Furthermore, for the advanced high-performance communication networks, such as the millimeter-wave communication system, there is required a dynamic system to overcome the one or more limitations of conventional systems. Moreover, the number of end-user devices, such as wireless sensors and IoT devices, is rapidly increasing with the increase in smart homes, smart offices, enterprises, etc. Existing communication systems are unable to handle such a massive number of wireless sensors and IoT devices and their quality-of-service (QoS) requirements. In such cases, it is extremely difficult and technically challenging to support these end-user devices in order to meet data communication at a multi-gigabit data rate.

Further limitations and disadvantages of conventional and traditional approaches will become apparent to one of skill in the art through comparison of such systems with some aspects of the present disclosure, as set forth in the remainder of the present application with reference to the drawings.

BRIEF SUMMARY OF THE DISCLOSURE

A repeater device with multi-range antenna array and a method of operation of the repeater device for high-performance communication, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

DETAILED DESCRIPTION OF THE DISCLOSURE

Figure 1:
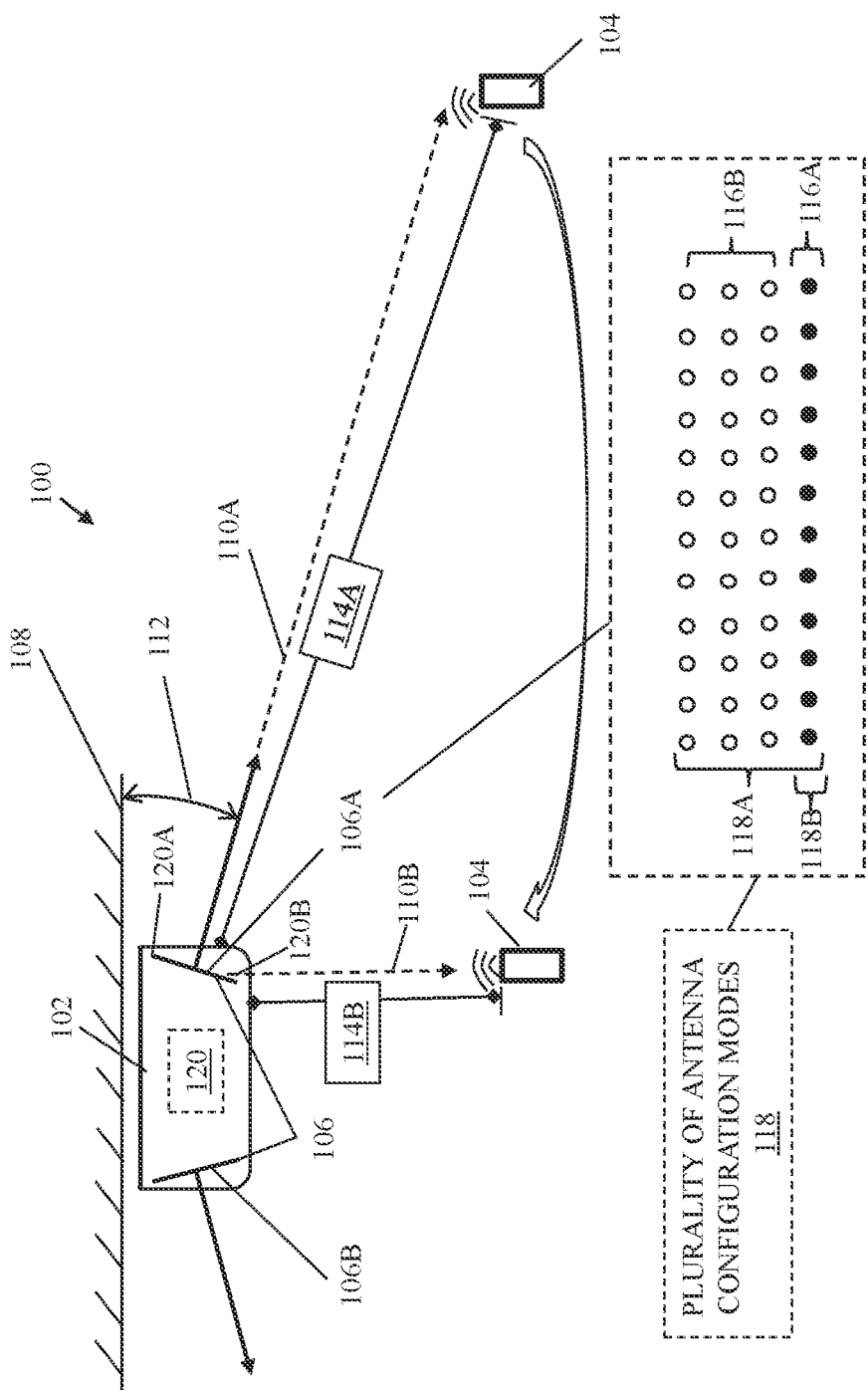
FIG. 1 is a diagram that represents a network environment of an exemplary repeater device with a multi-range antenna array, in accordance with an exemplary embodiment of the disclosure.

Certain embodiments of the disclosure may be found in a repeater device with a multi-range antenna array and method of operation of the repeater device for high-performance communication. The repeater device and method of the present disclosure not only improves power consumption (e.g., reduces power consumption) at the repeater device but also provides an enhanced quality of experience (QoE) for connected users. Typically, as the distance of one or more users, such as one or more user equipment (UEs), increases from a given antenna array, a path loss of a given beam of RF signal transmitted from the given antenna array may also increase proportionately. Similarly, a signal-to-noise ratio (SNR) may also be increased with the increase in the distance of the UE from the given antenna area. On the contrary, throughput (e.g., data throughput) may decrease with the increase in the distance of the UE from the given antenna array. Thus, depending on how far or near one or more UEs may be from the multi-range antenna array, the disclosed repeater device selects the most appropriate antenna configuration mode to reduce path loss, SNR, and power consumption while improving throughput. The dynamic selection of the most appropriate antenna configuration mode ensures a consistent QoE for the UEs.

Furthermore, the repeater device with the multi-range antenna array covers a wide range of angles in elevation as compared to conventional communication systems. Further, the repeater device with the multi-range antenna array extends the communication range compared to a typical phased array antenna. Alternatively stated, irrespective of the distance and position of the one or more UEs to the multi-range antenna array, the SNR across different scan ranges may be substantially equalized, resulting in approximately equalized throughput at the different communication ranges. Moreover, using different split sub-arrays in different antenna configuration modes of the disclosed repeater device, a path loss may be substantially equalized with a minimum number of chips, for example, in the ceiling, on a vertical or an angled wall and other deployment configurations of the repeater device. The disclosed repeater device thus enhances the wireless communication capacity, coverage, and reliability between a source network node and a destination network node, for high-performance communication.

Furthermore, the disclosed repeater device by virtue of the multi-range antenna array, is able to dynamically adjust a beam directivity from the multi-range antenna array, achieve different power combining for different antenna configuration modes provided in the repeater device, and further adjust pointing direction for different antenna configuration modes (e.g., long/short-range modes). Such features enables the repeater device (e.g., a ceiling/wall mounted unit) to reduce interference with other nearby installed repeater devices (e.g, other ceiling/wall mounted units). For example, let's say one repeater device (e.g., a first ceiling unit) has a user right under it, and another repeater device (e.g., a second ceiling unit) has another user right under it as well. In such a case, both the repeater devices may use the short-range modes to provide service to its respective users. Thus, one repeater device avoids sending radiation energy to another nearby reapeater device (e.g., the second ceiling unit), thereby reducing signal interference. Similarly, in the case where one repeater device (e.g., the first ceiling unit) may be servicing a user right under it (short-range), and the other repeater device (e.g., the second ceiling unit) may be servicing another user far away (long-range). In this case too, the first ceiling unit may avoid sending radiation energy to the second ceiling unit, and thus reduce signal interference, which also improves SNR and data throughput of both the repeater devices installed near to each other. In the following description, reference is made to the accompanying drawings, which form a part hereof, and in which is shown, by way of illustration, various embodiments of the present disclosure.

FIG. 1 is a diagram that illustrates a network environment of an exemplary repeater device with multi-range antenna array, in accordance with an exemplary embodiment of the disclosure. With reference to FIG. 1, there is shown a network environment 100 that includes a repeater device 102 and one or more user equipment (UEs), such as a UE 104. The repeater device 102 may include one or more antenna arrays 106, such as a first antenna array 106A and a second antenna array 106B.

The repeater device 102 includes suitable logic, circuitry, and interfaces that may be configured to communicate with one or more UEs, such as the UE 104. The repeater device 102 enables data communication at a multi-gigabit data rate. In accordance with an embodiment, the repeater device 102 may support multiple and a wide range of frequency spectrum, for example, 3G, 4G, and 5G (including out-of-band frequencies). Examples of the repeater device 102 may include, but is not limited to, a 5G wireless access point, a 5G-enabled ceiling-mounted communication device (commonly known as ceiling unit), a 5G-enabled wall-mounted communication device, an evolved-universal terrestrial radio access-new radio (NR) dual connectivity (EN-DC) repeater device, an NR-enabled cellular repeater device, a wireless local area network (WLAN)-enabled device, a home router, a MIMO-capable repeater device, or a combination thereof. The repeater device 102 may be communicatively coupled wirelessly or via a wired connection (e.g., over a copper cable, coaxial cable, an optic fiber, and the like) to an RF signal receiver (e.g., a donor repeater unit), which may receive RF signals from a source network node (e.g., a base station). In a case where the repeater device 102 is deployed indoors, the RF signal receiver may be deployed at a suitable position in a building suited to receive RF signals from the source network node. Examples of the source network node may include, but is not limited to, a base station (e.g., an Evolved Node B (eNB) or gNB), a small cell, a remote radio unit (RRU), or other network nodes or communication device provided in a network.

Each of the one or more UEs, such as the UE 104, refers to an end-user device or a destination network node. Examples of the UE 104 may include, but is not limited to, a smartphone, a customer-premises equipment (CPE), a user equipment, a virtual reality headset, an augmented reality device, a cable or satellite television set-top box, a VoIP base station, or any other customized hardware for telecommunication.

Each of the one or more antenna arrays 106, such as the first antenna array 106A and the second antenna array 106B, maybe a multi-range antenna array. Each of the first antenna array 106A and the second antenna array 106B may be one of an XG phased-array antenna panel, an XG-enabled antenna chipset, an XG-enabled patch antenna array, where the "XG" refers to 5G or 6G.

In accordance with an embodiment, the repeater device 102 may comprise control circuitry 120 that may be communicatively coupled to the one or more antenna arrays 106, such as the first antenna array 106A and the second antenna array 106B. The control circuitry 120 may be configured to execute various operations of the repeater device 102. Examples of the implementation of the control circuitry 120 may include but are not limited to an embedded processor, a microcontroller, a specialized digital signal processor (DSP), a Reduced Instruction Set Computing (RISC) processor, an Application-Specific Integrated Circuit (ASIC) processor, a Complex Instruction Set Computing (CISC) processor, and/or other processors, or state machines.

The repeater device 102 further comprises the first antenna array 106A that may comprise a plurality of antenna elements. The first antenna array 106A may comprise a plurality of antenna elements. The plurality of antenna elements may be sectioned into a plurality of different sub-arrays, such as a first sub-array 116A and a second sub-array 116B. In this exemplary implementation, the first antenna array 106A is described by taking an example of a 4×12 antenna array of 48 antenna elements, which may be sectioned into a linear array (may also be referred to as a non-split array), such as the first sub-array 116A, and a split 3 sub-array, such as the second sub-array 116B. The plurality of different sub-arrays may refer to sub-arrays that have a different number of antenna elements and a different number of split arrays. It is to be understood by one of ordinary skill in the art that the 4×12 antenna array is described for exemplary purpose and that different sizes of antenna array may be employed with different combinations and permutations of splits among different sub-arrays. For example, the plurality of antenna elements may be sectioned horizontally, vertically, or certain portions based on the different use cases. Another example of an antenna array that has four different sub-arrays is described, for example, in FIG. 3A.

The first antenna array 106A may further comprise a plurality of antenna configuration modes 118, where each antenna configuration mode of the plurality of antenna configuration modes 118 defines a unique configuration of one or more sub-arrays of the plurality of different sub-arrays. In accordance with an embodiment, each unique configuration of sub-arrays comprises a different number of antenna elements. In this implementation, a first antenna configuration mode 118A of the plurality of antenna configuration modes 118 may be a combination of the first sub-array 116A and the second sub-array 116B. Alternatively stated, in this exemplary implementation, the first antenna configuration mode 118A may have a 4×12 active aperture by a combination of the linear sub-array (i.e., a non-split sub-array) and the split 3 sub-array. Similarly, a second antenna configuration mode 118B of the plurality of antenna configuration modes 118 may be the first sub-array 116A (i.e., the linear sub-array).

In accordance with an embodiment, the first antenna array 106A may further comprise a feeding network that defines a distribution of conductive RF routings in accordance with the plurality of antenna configuration modes 118. The combination of the first sub-array 116A and the second sub-array 116B in the first antenna configuration mode 118A may be enabled by conductive RF routings configured to feed the antenna elements of the first sub-array 116A and the second sub-array 116B in the first antenna configuration mode 118A while reducing the use of chips. An example of the distribution of conductive RF routings is described in detail, for example, in FIGS. 5A and 5B.

In FIG. 1, the repeater device 102 is explained by taking an example of a ceiling mounted 5G-enabled communication device (i.e., a ceiling unit) deployed under a ceiling (such as a ceiling surface plane 108) of an enclosed area, such as a room, or an interior of a building. However, it is to be understood that the repeater device 102 may be a wall-mounted 5G-enabled communication device or a repeater device deployed under a bridge where the underneath of the bridge then acts as a ceiling surface, or another repeater device that may be deployed indoors or outdoors. The ceiling surface of the bridge may be a horizontal, angled, or curved.

In operation, the control circuitry 120 may be configured to select one of the plurality of antenna configuration modes 118 based on a distance of the UE 104 from the first antenna array 106A. As the distance of the UE 104 increases from the first antenna array 106A, a path loss of a given beam of RF signal transmitted from the first antenna array 106A may also increase proportionately. Similarly, a signal-to-noise ratio (SNR) may also be increased with the increase in the distance of the UE 104 from the first antenna array 106A. On the contrary, throughput (e.g., data throughput) may decrease with the increase in the distance of the UE 104 from the first antenna array 106A. Thus, depending on how far or near the UE 104 is from the first antenna array 106A, the control circuitry 120 selects the most appropriate (i.e., the best antenna configuration mode) to reduce (i.e., minimize) the path loss, SNR, and power consumption while improving the throughput to maintain a consistent quality of service (QoS) while serving the UE 104 irrespective of its distance from the first antenna array 106A.

In accordance with an embodiment, the control circuitry 120 may be further configured to select the first antenna configuration mode 118A from the plurality of antenna configuration modes 118 when the UE 104 is at the first communication range 114A from the first antenna array 106A. The first communication range 114A may correspond to a distance with respect to the first antenna array 106A that is greater than the second communication range 114B. For example, the UE 104 may be farthest away from the first antenna array 106A in a room but still within a communication range (i.e., the first communication range 114A) of the first antenna array 106A. In this case, to compensate for the path loss, the first antenna configuration mode 118A may be selected, which on selection combines the first sub-array 116A and the second sub-array 116B, thereby having a 4×12 active aperture for increased gain and directivity.

In accordance with an embodiment, the control circuitry 120 may be further configured to select the second antenna configuration mode 118B from the plurality of antenna configuration modes 118 when the UE 104 is near the first antenna array 106A in the second communication range 114B. The second communication range 114B may correspond to a distance with respect to the first antenna array 106A that is less than the first communication range 114A.

For example, the UE 104 may be very near (e.g., underneath the first antenna array 106A as shown) to the first antenna array 106A in the room (i.e., in the second communication range 114B) of the first antenna array 106A. In this case, there is comparatively less or almost no path loss, and thus the second antenna configuration mode 118B may be selected, where only the first sub-array 116A is excited, thereby having a 1×12 active aperture to minimize power consumption while maintaining the throughput, path loss, and SNR similar or almost same to that maintained in the first antenna configuration mode 118A. Further, there may be two types of scan range, such as an elevation scan range and an azimuth scan range. The elevation scan range may be understood as a vertical scan perpendicular to a ground surface, whereas the azimuth scan range may be understood as a horizontal scan almost parallel to the ground surface. Since only the bottom row of linear sub-array, that is, the first sub-array 116A, may be activated, the elevation scan range may be higher in the second antenna configuration mode 118B as compared to the first antenna configuration mode 118A.

In accordance with an embodiment, the selection of the one of the plurality of antenna configuration modes 118 may be further based on an angle of the UE 104 with respect to the first antenna array 106A in addition to the distance of the UE 104 from the first antenna array 106A. Beneficially, the first antenna array 106A and the second antenna array 106B may be arranged at a certain tilt with respect to a reference plane, such as the ceiling surface plane 108, and not perpendicular (i.e., not at a 90-degree angle) to the reference plane (e.g., the ceiling surface plane 108), as shown in FIG. 1, for example. For instance, the first antenna array 106A and the second antenna array 106B may be arranged at an angle 112 ranging from 5 to 35 degrees with respect to the reference plane, such as the ceiling surface plane 108. Thus, in a case where the UE 104 is very near (e.g., underneath the first antenna array 106A as shown) to the first antenna array 106A in the room (i.e., at the second communication range 114B) of the first antenna array 106A, the second antenna configuration mode 118B may be selected which enables increased elevation scan range (e.g., up to 90 degrees) and a comparatively broad beam to illuminate a region comprising the UE 104. Similarly, in a case where the UE 104 is far away from the first antenna array 106A (i.e., at the second communication range 114B), the first antenna configuration mode 118A may be selected, which enables communication of a narrow beam (i.e., more directive beam) towards the UE 104 at a comparatively less elevation scan range.

The control circuitry 120 may be further configured to activate a first configuration of one or more sub-arrays of the first antenna array 106A based on the selected one of the plurality of antenna configuration modes 118. In accordance with an embodiment, the first configuration of sub-arrays of the first antenna array 106A may be at least one of a single sub-array (such as the first sub-array 116A) of the plurality of different sub-arrays or a combination of two or more sub-arrays (such as the combination of the first sub-array 116A and the second sub-array 116B) of the plurality of different sub-arrays. For example, when the second antenna configuration mode 118B is selected, only the antenna elements of the first sub-array 116A may be activated while all the remaining antenna elements of the first antenna array 106A (e.g., the antenna elements of the second sub-array 116B) may be deactivated. Alternatively stated, based on the selected one of the plurality of antenna configuration modes 118, a first set of antenna elements of the first antenna array 106A may be activated whereas a second set of antenna elements of the first antenna array 106A may be deactivated. The first set of antenna elements that may be activated correspond to the first configuration of sub-arrays. Moreover, power (current) may be feed via RF routings of the feeding network of the first antenna array 106A such that only the antenna elements of the first sub-array 116A are activated. In another example, when the first antenna configuration mode 118A is selected, the antenna elements of the first sub-array 116A and the second sub-array 116B may be concurrently activated. Alternatively stated, power (current) may be feed via RF routings of the feeding network to both the first sub-array 116A and the second sub-array 116B such that the antenna elements of the first sub-array 116A and the second sub-array 116B are combined and activated.

The control circuitry 120 may be further configured to direct a beam of radio frequency (RF) signal (such as a first beam of RF signal 110A or a second beam of RF signal 110B) to the UE 104A from the activated first configuration of the one or more sub-arrays of the first antenna array 106A. The beam of RF signal may be directed to the UE 104A present in the first communication range 114A or the second communication range 114B from the first antenna array 106A such that one or more signal path parameters of the beam of RF signal are substantially equalized at the first communication range 114A and the second communication range 114B irrespective of a difference in the first communication range 114A and the second communication range 114B. In other words, irrespective of the distance and position of the UE 104 with respect to the first antenna array 106A, the one or more signal path parameters of the beam of RF signal are substantially equalized based on the dynamic selection of the one of the plurality of antenna configuration modes 118. The one or more signal path parameters of the beam of RF signal may be substantially equalized at different communication ranges, such as the first communication range 114A and the second communication range 114B while reducing the number of chips and power consumption for the operation of the repeater device 102 as compared to existing communication systems to achieve similar gain and throughput. In accordance with an embodiment, the one or more signal path parameters corresponds to one or more of a path loss, an SNR ratio, and a throughput. Alternatively stated, the SNR across different scan ranges may be substantially equalized, resulting in approximately equalized throughput at the different communication ranges, such as the first communication range 114A and the second communication range 114B. Thus, by utilizing different split sub-arrays in different antenna configuration modes of the plurality of antenna configuration modes 118, the path loss may be substantially equalized with a minimum number of chips, for example, in the ceiling and other deployment configurations of the repeater device 102. Furthermore, the repeater device 102 with the multi-range antenna array, i.e., the first antenna array 106A, covers a wide range of angle in elevation as compared to conventional communication systems and further extends communication range as compared to a typical phased array antenna.

In accordance with an embodiment, the beam of RF signal (such as the first beam of RF signal 110A) may be a pencil beam of RF signal directed from a combination of two or more sub-arrays of the first antenna array 106A to the UE 104 in the first communication range 114A and at a first angle from a reference plane, such as the ceiling surface plane 108. The two or more sub-arrays, such as the first sub-array 116A and the second sub-array 116B, of the first antenna array 106A may be combined in the first antenna configuration mode 118A, which may also be referred to as a long-range mode, when the UE 104 is located far away, i.e., at the first communication range 114A. In this case, the azimuth scan range may be approximately ±45 degree, whereas the elevation scan range may be approximately ±20 degrees from the first antenna array 106A, in the first antenna configuration mode 118A. Moreover, +3 dB higher output power may be achieved in the first antenna configuration mode 118A, and there maybe twice the number of active ports as compared to the second antenna configuration mode 118B, which may also be referred to as a short-range mode. In other words, the split-3 and non-split arrays with different power levels may be combined to refine the coverage envelope and achieve higher gain and directivity in the first antenna configuration mode 118A.

In accordance with an embodiment, the beam of RF signal may be a broad beam (such as the second beam of RF signal 110B) and may be directed from the first sub-array 116A of the first antenna array 106A to the UE 104 in the second communication range 114B and at a second angle (e.g., approximately 80-90 degree) from the reference plane, such as the ceiling surface plane 108. The first sub-array 116A may only be activated in the second antenna configuration mode 118B, which may also be referred to as a mid-range mode or short-range mode, when the UE 104 is located near the first antenna array 106A, i.e., at the second communication range 114B. In this case, the azimuth scan range may be approximately ±45 degrees, whereas the elevation scan range may increase significantly, for example, approximately ±60-90 degrees from the first antenna array 106A in the second antenna configuration mode 118B depending on the position of the UE 104. Moreover, the gain requirement is lower due to less path loss, and thus there may be only half the number of active ports in the second antenna configuration mode 118B as compared to the first antenna configuration mode 118A, thereby optimizing (i.e., reducing) power consumption.

In accordance with an embodiment, the first antenna array 106A may have a first end 120A and a second end 120B. The first end 120A may be at a first distance from a reference plane at which the repeater device is deployed, and the second end may be at a second distance from the reference plane, such as the ceiling surface plane 108. The first distance from the reference plane may be less than the second distance. In other words, the bottom row of antenna elements in the first sub-array 116A may be at the second distance and close to the second end 120B. Thus, an elevation scan range of the repeater device 102 may increase with an increase in the distance of an operating sub-array (such as the first sub-array 116A in this case) from the reference plane.

Figure 2:
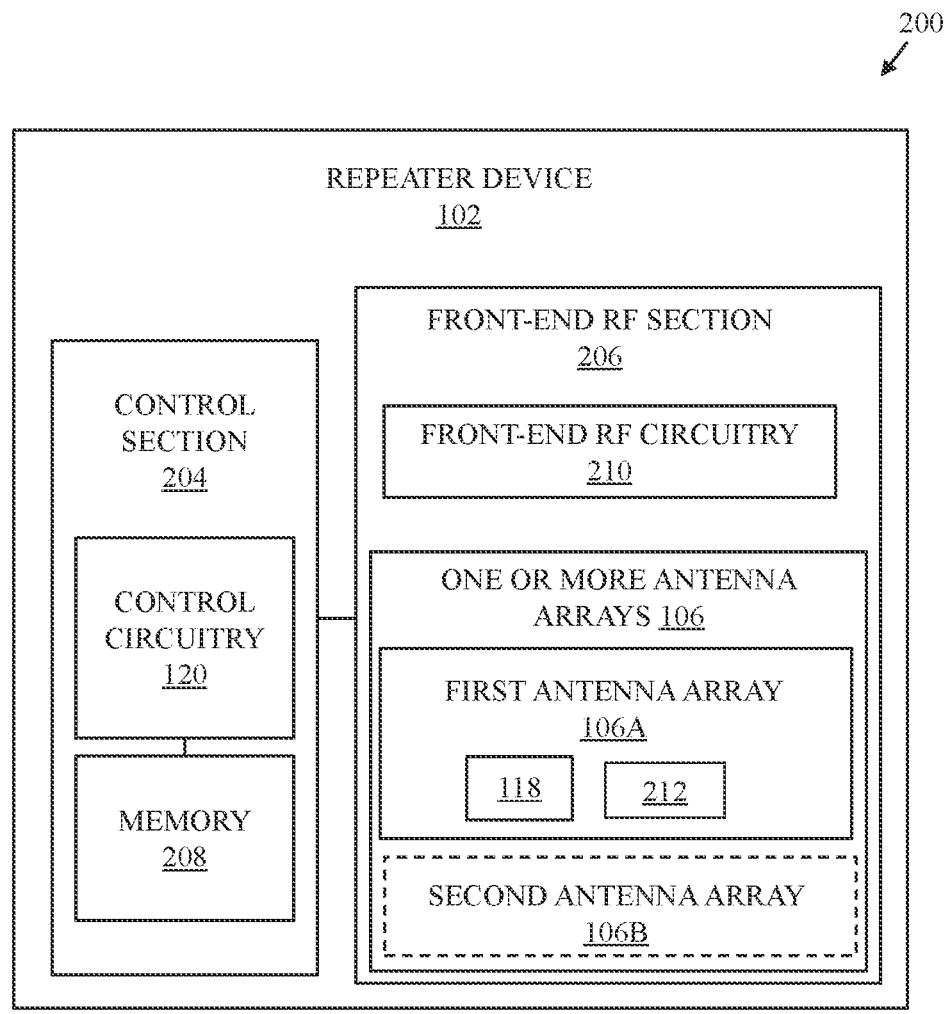
FIG. 2 is a block diagram that illustrates various components of an exemplary repeater device, in accordance with an exemplary embodiment of the disclosure.

FIG. 2 is a block diagram that illustrates various components of an exemplary repeater device, in accordance with an exemplary embodiment of the disclosure. With reference to FIG. 2, there is shown a block diagram 200 of the repeater device 102. The repeater device 102 may include a control section 204 and a front-end radio frequency (RF) section 206. The control section 204 may include the control circuitry 120 (FIG. 1) and a memory 208. The control section 204 may be communicatively coupled to the front-end RF section 206. The front-end RF section 206 may include front-end RF circuitry 210 and one or more antenna arrays 106, such as the first antenna array 106A and the second antenna array 106B (of FIG. 1). Each of the one or more antenna arrays 106 may include a feeding network, such as a feeding network 212 in the first antenna array 106A. There is further shown the plurality of antenna configuration modes 118 in the first antenna array 106A.

The control circuitry 120 may be communicatively coupled to the one or more antenna arrays 106, such as the first antenna array 106A, the second antenna array 106B, and the memory 208. The control circuitry 120 may be configured to execute various operations of the repeater device 102. The control circuitry 120 may be configured to control various components of the front-end RF section 206. The repeater device 102 may be a programmable device, where the control circuitry 120 may execute instructions stored in the memory 208.

The memory 208 may be configured store values, such as an active antenna configuration mode of the plurality of antenna configuration modes 118. Examples of the implementation of the memory 208 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 204 may further include one or more other components, such as an analog to digital converter (ADC), a digital to analog (DAC) converter, a cellular modem, and the like, known in the art, which are omitted for brevity.

The front-end RF circuitry 210 includes receiver circuitry and transmitter circuitry. In an example, the receiver circuitry may include a cascading receiver chain comprising various components for baseband signal processing or digital signal processing. For example, the receiver circuitry may include a cascading receiver chain comprising various components (e.g., the one or more receiving antenna arrays, a set of low noise amplifiers (LNA), a set of receiver front end phase shifters, and a set of power combiners) for the signal reception (not shown for brevity). In an example, transmitter circuitry may include a cascading transmitter chain comprising various components for baseband signal processing or digital signal processing. The receiver circuitry is coupled to the one or more receiving antenna arrays, such as one of the first antenna array 106A or the second antenna array 106B or may be a part of the receiver chain. The transmitter circuitry may be coupled to the one or more transmitting antenna arrays, such as the first antenna array 106A or the second antenna array 106B in an implementation. The front-end RF circuitry 210 supports millimeter-wave (mmWave) communication as well communication at a sub 6 gigahertz (GHz) frequency.

The feeding network 212 of the first antenna array 106A defines a distribution of conductive RF routings in accordance with the plurality of antenna configuration modes 118. An example of the feeding network 212 with the different distribution of the RF routings is further described, for example, in FIGS. 5A and 5B. In accordance with an embodiment, the repeater device 102 may further comprise a plurality of antenna arrays, for example, four antenna arrays, facing different directions to provide a 360-degree coverage in its surrounding area. An example of the repeater device with four antenna arrays is described, for example, in FIGS. 7A and 7B. In an example, the one or more multi-range antenna array, such as the first antenna array 106A, may be used to substantially equalize the SNR, the EIRP, the path loss, the throughput across different scan ranges (e.g., elevation scan range or azimuth scan range), for example, the different communication ranges, such as the first communication range 114A and the second communication range 114B. In another example, the one or more multi-range antenna array, such as the first antenna array 106A, may be further used to execute gain and phase control to enhance the MIMO channel's degrees of freedom, MIMO capacity, effective SNR, and diversity rank, among other parameters.

Figure 3A:
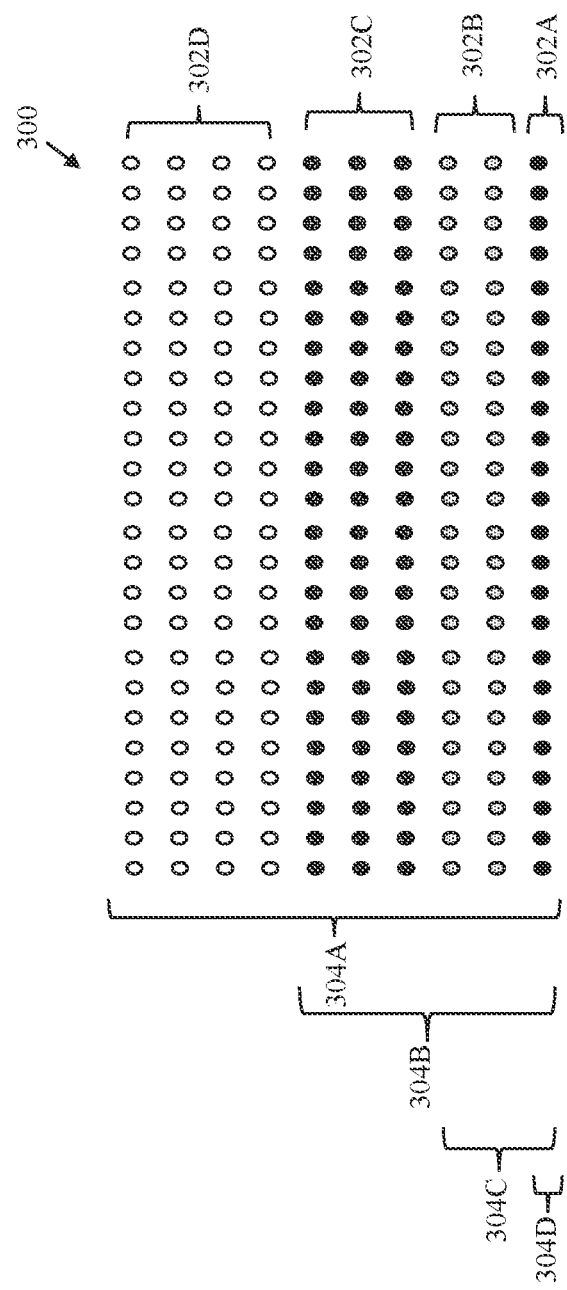
FIG. 3A is a diagram that illustrates an exemplary multi-range antenna array of a repeater device, in accordance with an exemplary embodiment of the disclosure.

FIG. 3A is a diagram that illustrates an exemplary multi-range antenna array of a repeater device, in accordance with an exemplary embodiment of the disclosure. FIG. 3A is explained in conjunction with elements from FIGS. 1 and 2. With reference to FIG. 3A, there is shown an exemplary multi-range antenna array, such as an antenna array 300. The antenna array 300 corresponds to the first antenna array 106A of the repeater device 102 of FIG. 1.

In accordance with an embodiment, a plurality of antenna elements of the antenna array 300 may be sectioned into a plurality of different sub-arrays, such as a first sub-array 302A (i.e., a linear non-split array), a second sub-array 302B (i.e., a split 2 sub-array), a third sub-array 302C (i.e., a split 3 sub-array), and a fourth sub-array 302D (i.e., a split 4 sub-array). In this implementation, the antenna array 300 may be a 10×24 antenna array of 240 antenna elements. The antenna array 300 may further comprise different antenna configuration modes, such as a first antenna configuration mode 304A, a second antenna configuration mode 304B, a third antenna configuration mode 304C, and a fourth antenna configuration mode 304D. The fourth antenna configuration mode 304D comprises only a linear non-split array, i.e., the first sub-array 302A. The third antenna configuration mode 304C, also comprises the first sub-array 302A and additionally, the second sub-array 302B. The second antenna configuration mode 304B may be a combination of three different sub-arrays, such as the first sub-array 302A, the second sub-array 302B, and the third sub-array 302C. The first antenna configuration mode 304A may be a combination of all the different sub-arrays, such as the first sub-array 302A, the second sub-array 302B, the third sub-array 302C, and the fourth sub-array 302D.

In this implementation, the elevation scan range of the antenna array 300 is highest for the fourth antenna configuration mode 304D and comparatively lowest for the first antenna configuration mode 304A. Alternatively stated the elevation scan range of the first antenna configuration mode 304A <elevation scan range of the second antenna configuration mode 304B<elevation scan range of the third antenna configuration mode 304C <elevation scan range of the fourth antenna configuration mode 304D. In terms of gain, the gain of the first antenna configuration mode 304A >gain of the second antenna configuration mode 304B>gain of the third antenna configuration mode 304C >gain of the fourth antenna configuration mode 304D. In terms of transmission (Tx) power, the Tx power of the first antenna configuration mode 304A >TX power of the second antenna configuration mode 304B>TX power of the third antenna configuration mode 304C >TX power of the fourth antenna configuration mode 304D. In terms of effective isotropic radiated power (EIRP), the EIRP of the first antenna configuration mode 304A >EIRP of the second antenna configuration mode 304B>EIRP of the third antenna configuration mode 304C >EIRP of the fourth antenna configuration mode 304D.

Figure 3B:
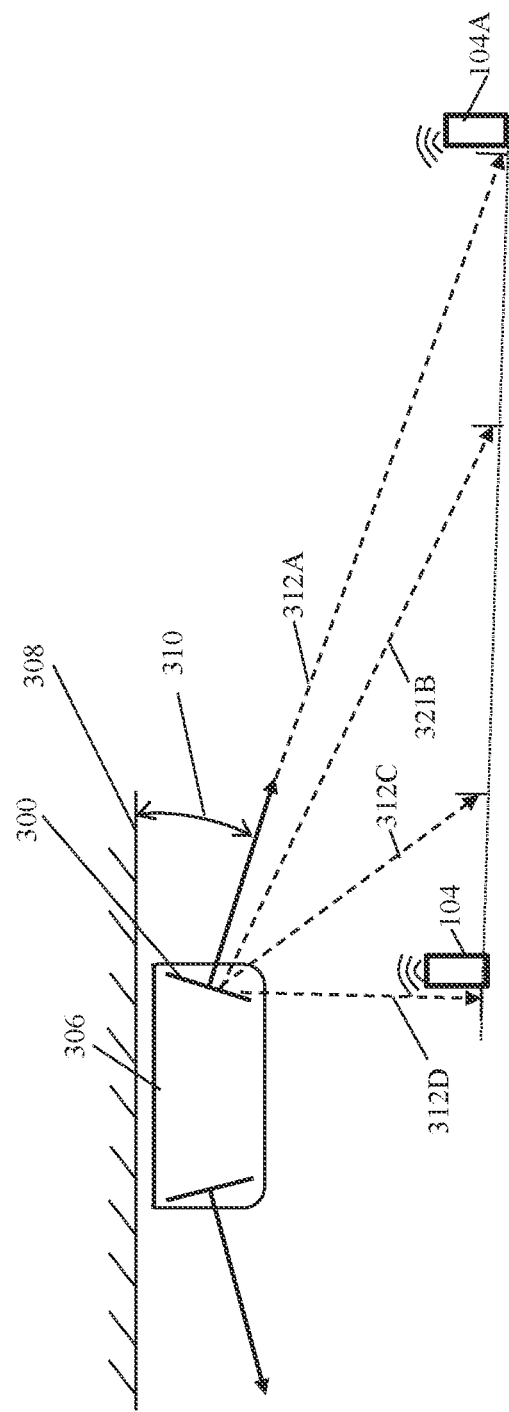
FIG. 3B is a diagram that illustrates an exemplary scenario of implementation of a repeater device with the multi-range antenna array of FIG. 3A, in accordance with an exemplary embodiment of the disclosure.

FIG. 3B is a diagram that illustrates an exemplary scenario of implementation of a repeater device with the multi-range antenna array of FIG. 3A, in accordance with an exemplary embodiment of the disclosure. FIG. 3B is explained in conjunction with elements from FIGS. 1, 2, and 3A. With reference to FIG. 3B, there is shown a repeater device 306 with the multi-range antenna array, such as the antenna array 300 (of FIG. 3A). The repeater device 306 may correspond to the repeater device 102 of FIG. 1. In the exemplary scenario, the repeater device 306 may be a ceiling-mounted 5G-enabled communication device, where the antenna array 300 is arranged at an angle 310 (e.g., approximately 15 degrees) from a reference plane, such as a ceiling surface plane 308.

The repeater device 306 may include the control circuitry 120 configured to select the first antenna configuration mode 304A when the UE 104 is at a first communication range 312A from the antenna array 300. Similarly, the control circuitry 120 may be configured to select the second antenna configuration mode 304B, the third antenna configuration mode 304C, or the fourth antenna configuration mode 304D when the UE 104 is at a second communication range 312B, a third communication range 312C, or a fourth communication range 312D, respectively. In a case where the second antenna configuration mode 304B is selected, the combination of the three different sub-arrays, i.e., the first sub-array 302A, the second sub-array 302B, and the third sub-array 302C, may be activated, whereas the fourth sub-array 302D may be deactivated. However, in a case where the third antenna configuration mode 304C is selected, the combination of two different sub-arrays, i.e., the first sub-array 302A and the second sub-array 302B, may be activated, whereas the third sub-array 302C and the fourth sub-array 302D may be deactivated. Similarly, when the fourth antenna configuration mode 304D is selected, the first sub-array 302A may be activated, whereas the second sub-array 302B, the third sub-array 302C, and the fourth sub-array 302D may be deactivated. However, when the first antenna configuration mode 304A is selected, all the different sub-arrays may be combined and activated. The control circuitry 120 may be configured to substantially equalize the one or more signal path parameters, such as path loss, SNR, and throughput, of the beam of RF signal, are substantially equalized at different elevation scan ranges, irrespective of communication of a beam of RF signal to the UE 104 at different communication ranges. Such equalization may be achieved because of the dynamic selection of the most appropriate antenna configuration mode of the plurality of different antenna configuration modes 304A to 304D, which in turn selectively combines, activates, and deactivates the different sub-arrays as per the selected antenna configuration mode. It is to be understood that the FIG. 3B is explained by taking an example of one UE, such as the UE 104. However, multiple UEs may be serviced in mmWave communication (both in FR1 or FR2 5G NR frequencies) concurrently by the disclosed repeater device, such as the repeater device 306.

Furthermore, because of the dynamic selection of appropriate antenna configuration mode of the plurality of different antenna configuration modes 304A to 304D, the repeater device 306 is able to dynamically adjust a beam directivity from the multi-range antenna array (i.e., the antenna array 300 in this case), achieve different power combining using RF routings of a feeding network for different antenna configuration modes provided in the repeater device 306, and further adjust pointing direction for different antenna configuration modes (e.g., long/short-range modes). Such features enables the repeater device 306 (e.g., the ceiling mounted unit) to reduce interference with other nearby installed repeater devices (e.g, other ceiling/wall mounted units). For example, let's say one repeater device (e.g., a first ceiling unit) has a user right under it (e.g., like the UE 104 in the fourth communication range 312D in the FIG. 3B), and another repeater device (e.g., a second ceiling unit) has another user right under it as well. In such a case, both the repeater devices may use the short-range modes to provide service to its respective users. Thus, one repeater device avoids sending radiation energy to another nearby reapeater device (e.g., the second ceiling unit), thereby reducing signal interference. Similarly, in the case where one repeater device (e.g., the first ceiling unit) may be servicing a user right under it (short-range), and the other repeater device (e.g., the second ceiling unit) may be servicing another user far away (long-range). In this case too, the first ceiling unit may avoid sending radiation energy to the second ceiling unit, and thus reduce signal interference, which also improves SNR and data throughput of both the repeater devices installed near to each other.

Figure 4:
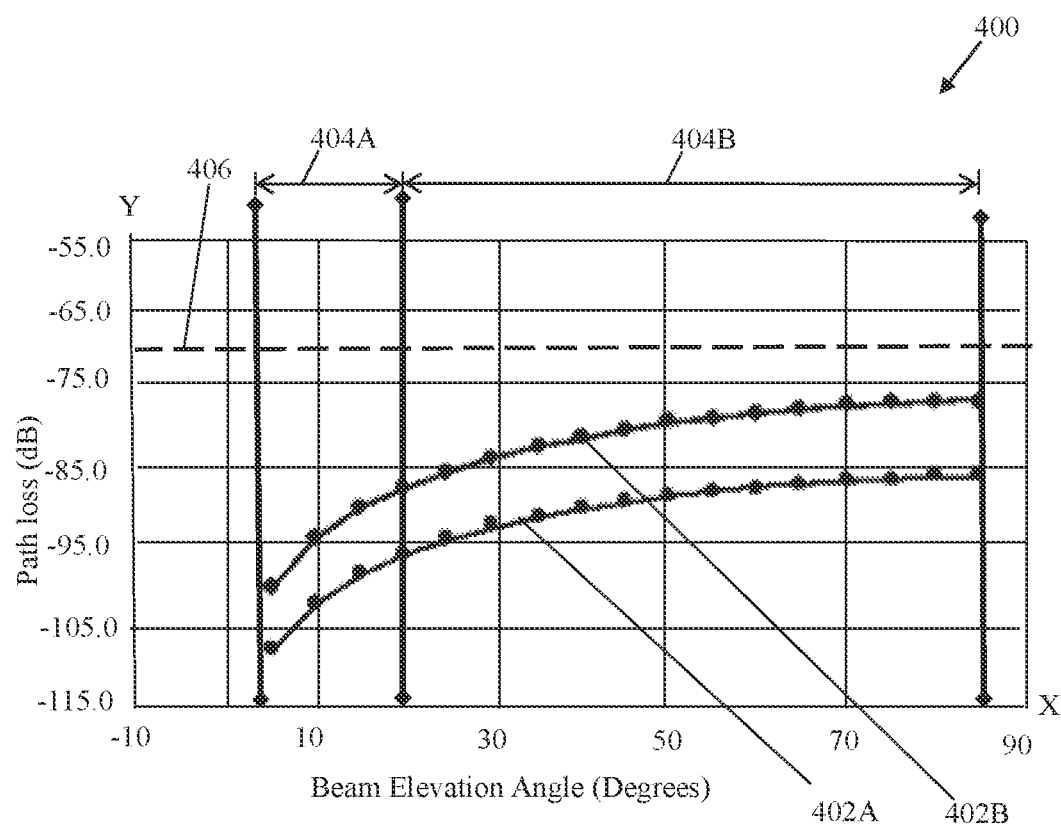
FIG. 4 is a diagram that illustrates a graphical representation that depicts a beam elevation angle with respect to a pass loss for different communication ranges, in accordance with an exemplary embodiment of the disclosure.

FIG. 4 is a diagram that illustrates a graphical representation that depicts a beam elevation angle with respect to a pass loss for different communication ranges, in accordance with an exemplary embodiment of the disclosure. FIG. 4 is explained in conjunction with elements from FIGS. 1, 2, 3A, and 3B. With reference to FIG. 4, there is shown a graphical representation 400 that shows beam elevation angle in degrees on its X-axis versus path loss on its Y-axis. There is further shown a first line plot 402A representing data of different path loss across different elevation service area tested for a first ceiling height (e.g., from a floor surface). There is further shown a second line plot 402B representing data of different path loss across different elevation service area tested for a second ceiling height (e.g., from a floor surface). As observed from both the first line plot 402A and the second line plot 402B, the path loss is more a first region 404A as compared to a second region 404B. The first region 404A corresponds to an elevation service area that is far away from a typical antenna array. The second region 404B corresponds to a different elevation service area that is comparatively near to the typical antenna array. In the FIG. 4, there is shown a free-space path loss. The disclosed repeater device (such as the repeater device 102 or 306) may be mounted in a ceiling configuration, and thus most of the path-loss contribution may come from free-space propagation. However, in the non-line of sight (NLOS) conditions with the UE 104, the pass loss is even more severe, and thus, the disclosed repeater device in the different deployment configuration, for example, in wall-mounted configuration, may also be effective to achieve the goal, for example, in azimuth scan range.

In the FIG. 4, a third line 406 represents a goal achieved in terms of EIRP, SNR, path loss, and throughput that may be substantially equalized across different elevation service area (e.g., the first region 404A and the second region 404B) when the multi-range antenna array (e.g., the first antenna array 106A or the antenna array 300) is used by a repeater device (such as the repeater device 102 or 306). The first region 404A may comprise one or more users, such as the UE 104, serviced by the disclosed repeater device (such as the repeater device 102 or 306). The first region 404A may correspond to the first communication range 114A of FIG. 1 or a service area covering the first communication range 312A and the second communication range 312B of FIG. 3B (i.e., long-range). Similarly, the second region 404B may comprise one or more users, such as the UE 104, serviced by the disclosed repeater device (such as the repeater device 102 or 306). The second region 404B may correspond to the second communication range 114B (of FIG. 1) or a service area covering the third communication range 312C and the fourth communication range 312D of FIG. 3B (i.e., short-range or mid-range). Alternatively stated, the path loss and other signal path parameters may be substantially equalized across different elevation service areas to maintain a consistent QoE for all users served by the disclosed repeater device (such as the repeater device 102 or 306). The multi-range antenna array (e.g., the first antenna array 106A or the antenna array 300) enables to achieve the goal, where a higher gain is delivered at low elevation angles (e.g., long-range communication), and a lower gain is delivered at high elevation angles (e.g., short-range, or mid-range communication).

Figure 5A:
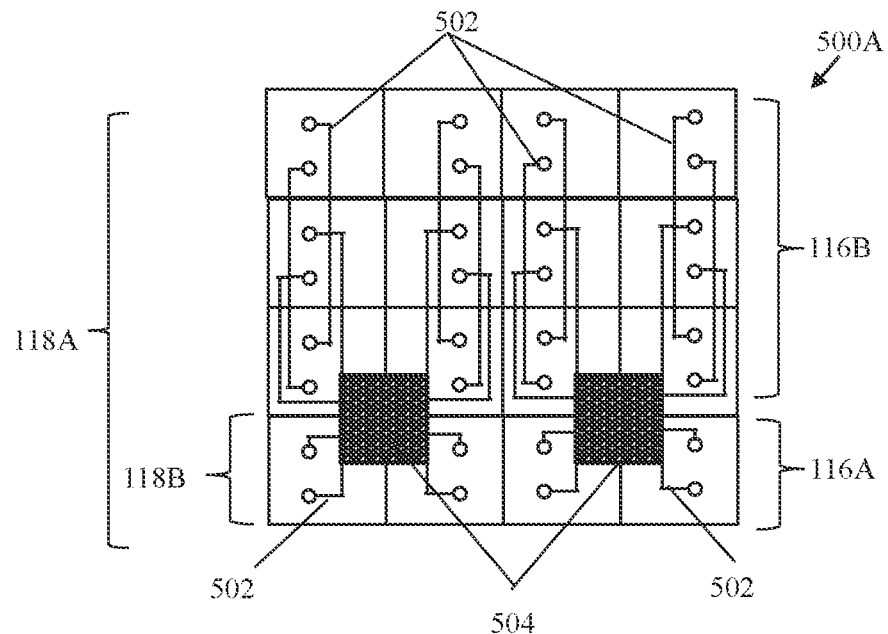
FIG. 5A is a diagram that illustrates an exemplary antenna array that depicts a feeding network, in accordance with an exemplary embodiment of the disclosure.

FIG. 5A is a diagram that illustrates an exemplary antenna array that depicts a feeding network, in accordance with an exemplary embodiment of the disclosure. FIG. 5A is explained in conjunction with elements from FIGS. 1, 2, 3A, 3B, 4. With reference to FIG. 5A, there is shown a 4×4 antenna array 500A with a feeding network 502 comprising a distribution of conductive RF routings in accordance with the plurality of antenna configuration modes 118. There is further shown two chips configuration, such as chips 504, and the distribution of RF routings from the chips 504 which enables combining of two or more sub-arrays of the plurality of different sub-arrays in different antenna configuration modes while reducing the usage of chips as compared to conventional systems. For example, in the first antenna configuration mode 118A, the bottom non-split single sub-array, such as the first sub-array 116A, and the 3-split subarray, such as the second sub-array 116B, maybe combined without any increase in the number of chips. In this case, both chips 504 may be arranged at the intersection of the first sub-array 116A and the second sub-array 116B, as shown in an example.

Figure 5B:
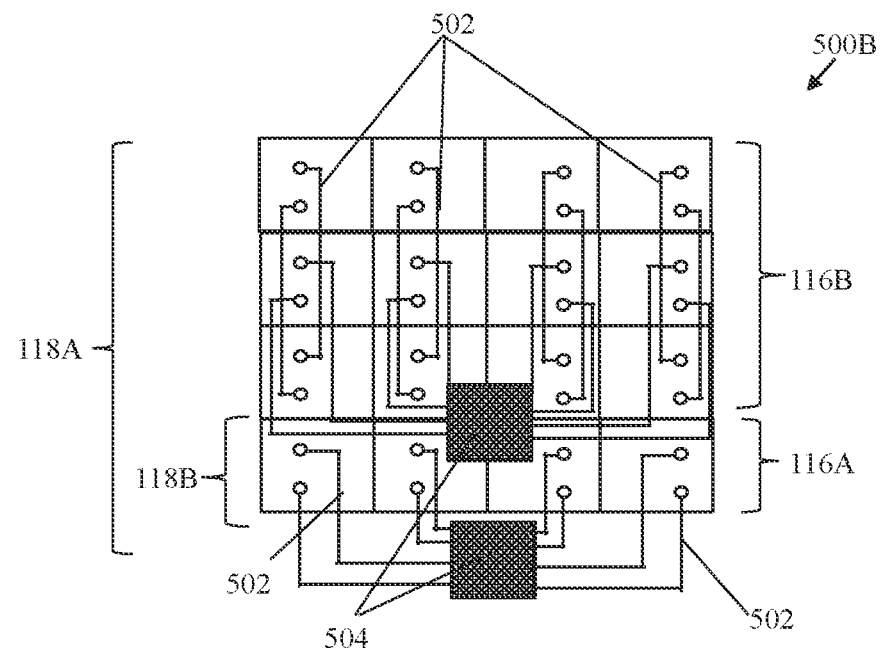
FIG. 5B is a diagram that illustrates an exemplary antenna array that depicts a feeding network, in accordance with another exemplary embodiment of the disclosure.

FIG. 5B is a diagram that illustrates an exemplary antenna array that depicts a feeding network, in accordance with another exemplary embodiment of the disclosure. FIG. 5B is explained in conjunction with elements from FIGS. 1, 2, 3A, 3B, 4, and 5A. With reference to FIG. 5B, there is shown a 4×4 antenna array 500B with a feeding network 502 comprising another exemplary distribution of conductive RF routings in accordance with the plurality of antenna configuration modes 118. There is further shown two chips configuration, such as chips 504, and the distribution of RF routings from the chips 504, which enables combining of two or more sub-arrays of the plurality of different sub-arrays in different antenna configuration modes while reducing the usage of chips as compared to conventional systems. In this case, one of the chips 504 may be arranged at the intersection of the first sub-array 116A and the second sub-array 116B and the other chip may not be arranged at the intersection, for example, maybe arranged below (as shown) on a printed circuit board (PCB), in an example.

Figure 6A:
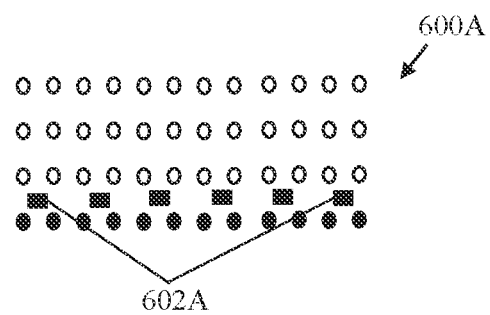
FIGS. 6A, 6B, and 6C are diagrams that illustrate different exemplary antenna arrays with different chips configurations, in accordance with various embodiments of the disclosure.
Figure 6B:
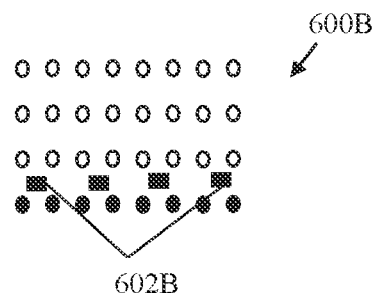
Figure 6C:
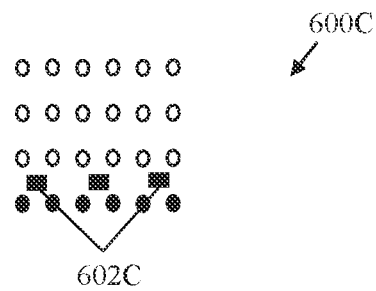

FIGS. 6A, 6B, and 6C are diagrams that illustrate different exemplary antenna arrays with different chips configurations, in accordance with various embodiments of the disclosure. FIGS. 6A, 6B, and 6C, are explained in conjunction with elements from FIGS. 1, 2, 3A, 3B, 4, 5A, and 5B. With reference to FIGS. 6A, 6B, and 6C, there are shown different exemplary multi-range antenna arrays, such as a 4×12 antenna array 600A with a six chips configuration 602A, a 4×8 antenna array 600B with a four chips configuration 602B, and a 4×6 antenna array 600C with a three chips configuration 602C, respectively. In the FIG. 6A, for the 4×12 antenna array 600A with the six chips configuration 602A, an additional gain achieved for mmWave communication maybe about 22.15 dB, where the gain from the power combining may be approximately 13.8 dB, and EIRP of about 40.9 dBm. In the FIG. 6B, for the 4×8 antenna array 600B with the four chips configuration 602B, an additional gain achieved for mmWave communication may be about 20.4 dB, where the gain from the power combining may be approximately 12 dB, and EIRP of about 37.4 dBm. In the FIG. 6C, for the 4×6 antenna array 600C with the three chips configuration 602C, an additional gain achieved for mmWave communication may be about 19.22 dB, where the gain from the power combining may be approximately 10.8 dB, and EIRP of about 35 to 40.96 dBm.

Figure 7A:
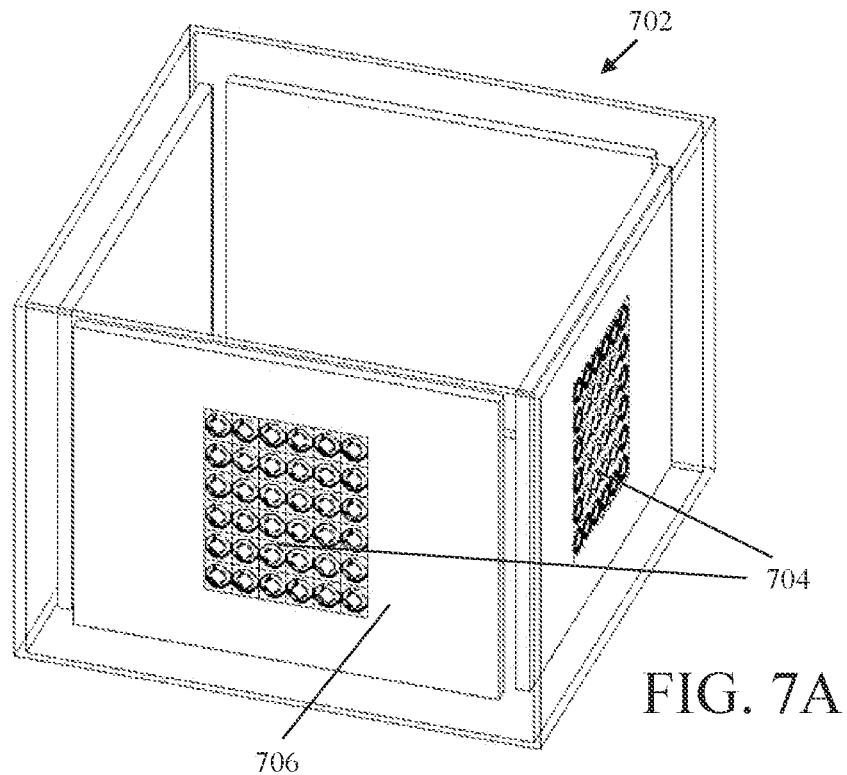
FIG. 7A is a diagram that illustrates a perspective view of an exemplary repeater device with four multi-range antenna arrays, in accordance with various embodiments of the disclosure.

FIG. 7A is a diagram that illustrates a perspective view of an exemplary repeater device with four multi-range antenna arrays, in accordance with various embodiments of the disclosure. FIG. 7A is explained in conjunction with elements from FIGS. 1, 2, 3A, 3B, 4, 5A, 5B, 6A, 6B, and 6C. With reference to FIG. 7A, there is shown a repeater device 702 having a plurality of antenna arrays 704, such as four antenna arrays, arranged at four different faces of a box-like repeater device, as shown, in this exemplary implementation. Each of the plurality of antenna arrays 704 may be arranged on a corresponding printed circuit board (PCB), such as a PCB 706. In this implementation, the repeater device 702 may be a square-shaped or a box-like repeater device. However, in some implementation, the repeater device 702 may be a circular-shaped repeater device with a multi-range phased array antenna surrounding the outer surface in the form of a circular strip, where the PCB may be conformed to the circular shape of the repeater device. Further, in some implementations, the repeater device 702 may be a hexagonal-shaped or a triangular-shaped repeater device having three multi-range antenna arrays.

Figure 7B:
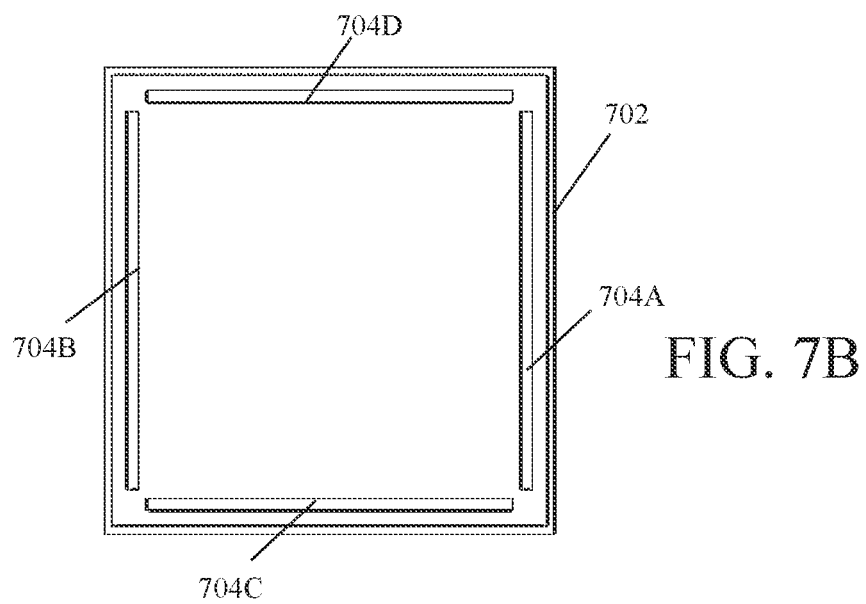
FIG. 7B is a diagram that illustrates a schematic view of the exemplary repeater device of FIG. 7A, in accordance with various embodiments of the disclosure.

FIG. 7B is a diagram that illustrates a schematic view of the exemplary repeater device of FIG. 7A, in accordance with various embodiments of the disclosure. With reference to FIG. 7B, there is shown the repeater device 702 having four antenna arrays, such as a first antenna array 704A, a second antenna array 704B, a third antenna array 704C, and a fourth antenna array 704D, each of which is arranged almost orthogonal to each other.

Figure 8:
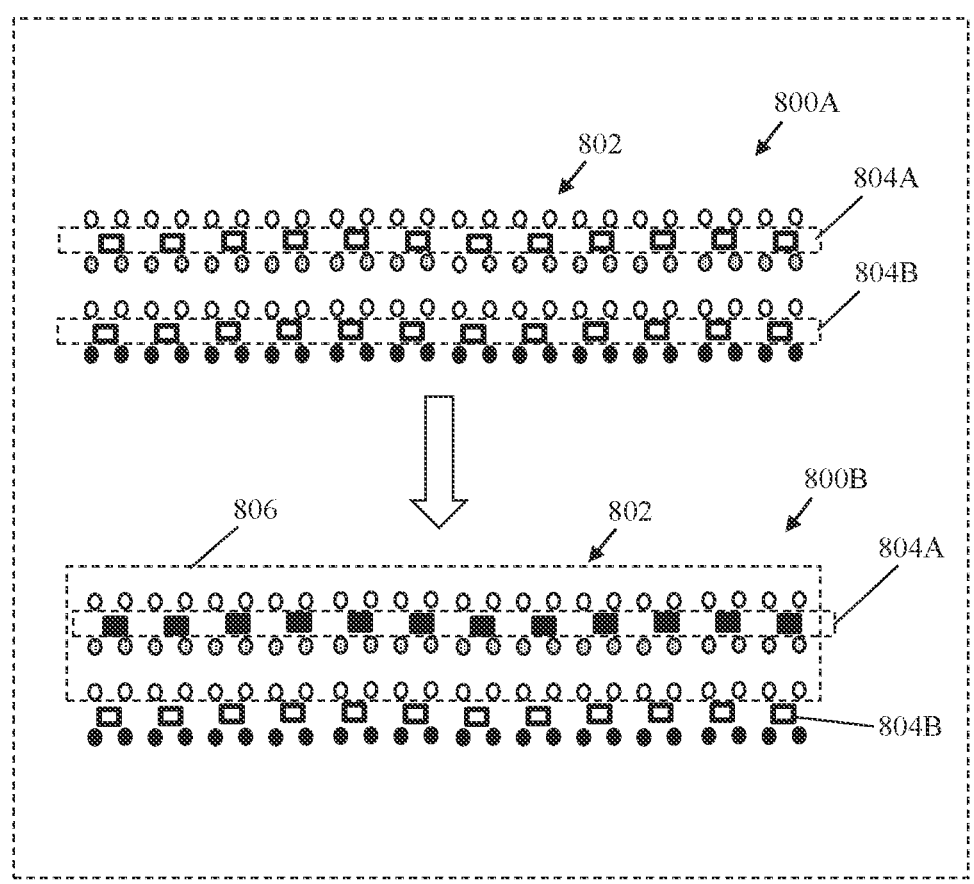
FIG. 8 is a diagram that illustrates an exemplary antenna array in different states, in accordance with yet another embodiment of the disclosure.

FIG. 8 is a diagram that illustrates an exemplary antenna array in different states, in accordance with yet another embodiment of the disclosure. FIG. 8 is explained in conjunction with elements from FIGS. 1, 2, 3A, 3B, 4, 5A, 5B, 6A, 6B, 6C, 7A, and 7B. With reference to FIG. 8, there is shown an antenna array, such as a 4×24 antenna array 802 in a first state 800A and a second state 800B. In the first state 800A, a first set of chips 804A arranged on the top row as well as a second set of chips 804B arranged on the bottom row both may be enabled and further all the antenna elements of the 4×24 antenna array 802 may be active. In such a configuration, there may be a uniform peak gain across different elevation fields of view, which may not be suitable for coverage of users, such one or more UEs, right under a ceiling unit, such as the repeater device 102, because the 4×24 antenna array 802 beamforming may not scan, for example, more than 60 degrees in the elevation scan range. Moreover, if the sub-arrays (represented by different pattern fill) are not combined using RF routings by use of an antenna configuration mode (as described in FIGS. 1, 2, 3A, and 3B), there may not be enough gain and/or EIRP to cover the far users (not enough range). However, in the second state 800B, the 4×24 antenna array 802 may be configured as a multi-range antenna array where, by disabling the chips, i.e., the first set of chips 804A arranged on the top row and some of the ports, for example, one or more ports of the second set of chips 804B on the bottom row, and further deactivating the antenna elements (shown within a representation 806), a beam of RF signal from the 4×24 antenna array 802 may be broadened in elevation scan range since only the bottom row of antenna elements of a single sub-array is active. This type of beam may be useful when covering one or more users, i.e., UEs, by radiating a broad beam of RF signal (e.g., a mmWave beam) for users positioned right under the ceiling unit (e.g., the repeater device 102). It is to be understood that the rectangular boxes in the dashed form are shown for representation purposes only and do not form part of the circuitry of the 4×24 antenna array 802.

Figure 9:
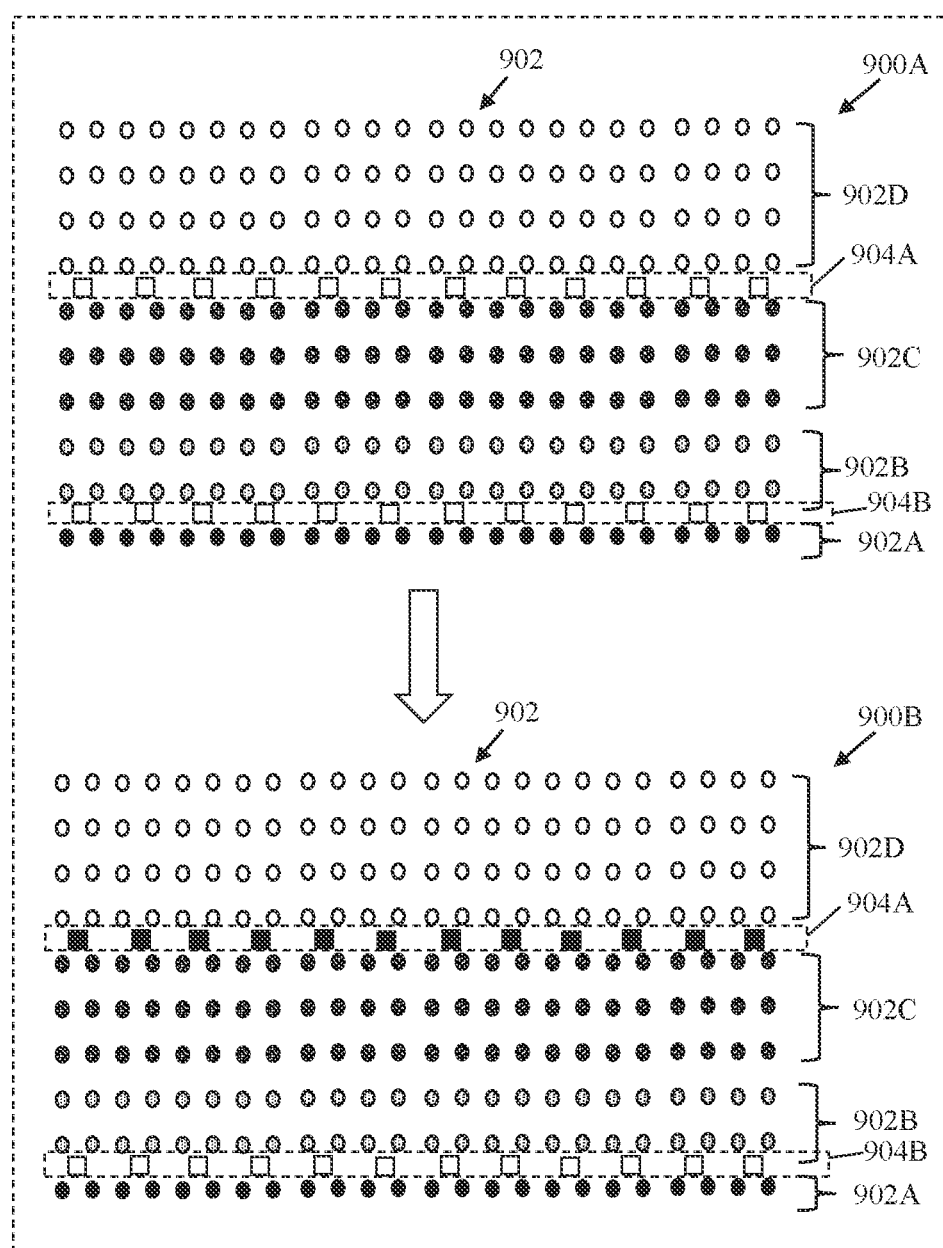
FIG. 9 is a diagram that illustrates an exemplary multi-range antenna array, in accordance with another embodiment of the disclosure.

FIG. 9 is a diagram that illustrates an exemplary multi-range antenna array, in accordance with another embodiment of the disclosure. FIG. 8 is explained in conjunction with elements from FIGS. 1, 2, 3A, 3B, 4, 5A, 5B, 6A, 6B, 6C, 7A, 7B, and 8. With reference to FIG. 9, there is shown an exemplary multi-range antenna array, such as a 10×24 antenna array 902 in a first state 900A and a second state 900B. The 10×24 antenna array 902 corresponds to the antenna array 300 of FIG. 3A but further shows chips configuration and control, in an example. There is further shown a plurality of different sub-arrays of the 10×24 antenna array 902, such as first sub-array 902A, a second sub-array 902B, a third sub-array 902C, and a fourth sub-array 902D.

In the first state 900A, a first set of chips 904A arranged at the intersection of the third sub-array 902C and the fourth sub-array 902D, as well as a second set of chips 904B arranged at the intersection of the first sub-array 902A and the second sub-array 902B, may be enabled. In this case, to boost the gain for the far users, the different split sub-arrays 902A to 902D may be selectively combined using the feeding network, to produce a gradient of beams that manifest a narrow beam with high gain (for far users) to a wider beam with lower gain (for nearby users of the disclosed repeater device, such as the ceiling unit), in such a way that the SNR, throughput, and path loss may be approximately equalized at all the different communication ranges (different distances of the UEs that may be serviced). For example, in the first state 900A, a first antenna configuration mode may be used that combines the different split sub-arrays 902A to 902D to generate a narrow pencil beam that is highly directive with high gain to reach farthest UEs in a room (e.g., a long-range).

In the second state 900B, in the 10×24 antenna array 902, all the antenna elements of the second sub-array 902B, the third sub-array 902C, and the fourth sub-array 902D, and further the first set of chips 904A may be disabled based on a selection of another antenna configuration mode. Further, the antenna elements of only the first sub-array 902A and the second set of chips 904B may be enabled. In this case, a broad beam of RF signal may be communicated, for example, a mmWave signal, from the first sub-array 902A to cover one or more nearby users, i.e., UEs, for example, under the ceiling unit (e.g., the repeater device 102). It is to be understood that the rectangular boxes in the dashed form are shown for representation purposes only and do not form part of the circuitry of the 10×24 antenna array 902.

Figure 10A:
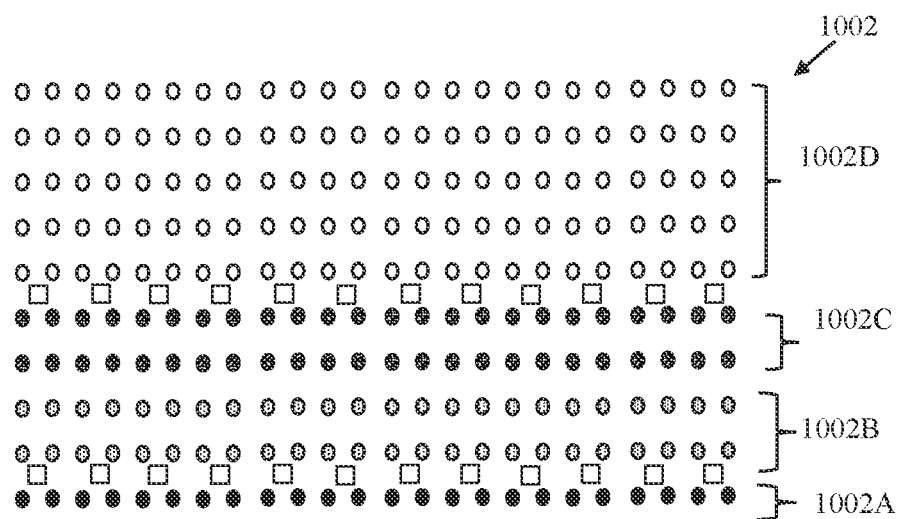
FIGS. 10A, 10B, and 10C are diagrams that illustrate different exemplary multi-range antenna arrays, in accordance with various embodiments of the disclosure.
Figure 10B:
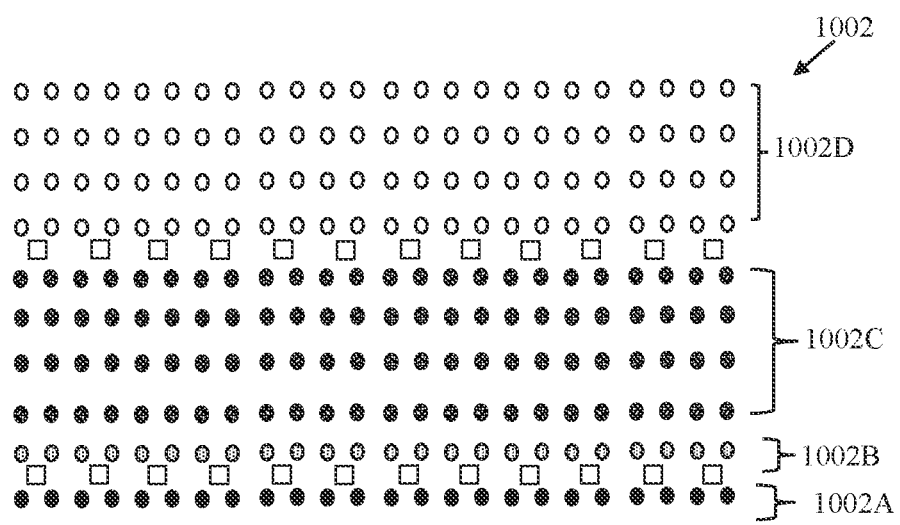
Figure 10C:
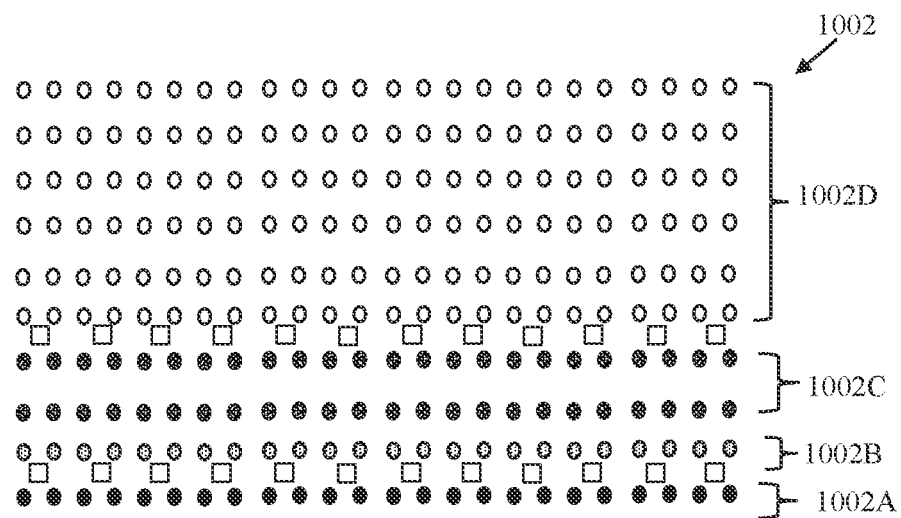

FIGS. 10A, 10B, and 100 are diagrams that illustrate different exemplary multi-range antenna arrays, in accordance with various embodiments of the disclosure. FIGS. 10A, 10B, and 100 are explained in conjunction with elements from FIGS. 1, 2, 3A, 3B, 4, 5A, 5B, 6A, 6B, 6C, 7A, 7B, 8, and 9. With reference to FIGS. 10A, 10B, and 10C, there is shown a multi-range antenna array, such as a 10×24 antenna array 1002 with a different configuration of sub-arrays, such as a first sub-array 1002A, a second sub-array 1002B, a third sub-array 1002C, a fourth sub-array 1002D.

Rerring to FIG. 10A, the first sub-array 1002A may comprise 12 antenna elements arranged in a row. Both the second sub-array 1002B and the third sub-array 1002C may be split-2 sub-arrays, each comprising the same number of antenna elements, such as 24 antenna elements, arranged in two rows, whereas the fourth sub-array 1002D may be a split-5 sub-array comprising 60 antenna elements arranged in five rows. Referring to FIG. 10B, each of the first sub-array 1002A and the second sub-array 1002B may be a non-split array comprising 12 antenna elements arranged in a row. Further, each of the third sub-array 1002C and the fourth sub-array 1002D may be split-4 sub-array, each comprising the same number of antenna elements, such as 48 antenna elements, arranged in four rows. Referring to FIG. 10O, each of the first sub-array 1002A and the second sub-array 1002B may be a non-split array comprising 12 antenna elements arranged in a row. However, the third sub-array 1002C may be a split-2 sub-array comprising 24 antenna elements, arranged in two rows, whereas the fourth sub-array 1002D may be a split-6 sub-array comprising 72 antenna elements, arranged in six rows.

Figure 11:
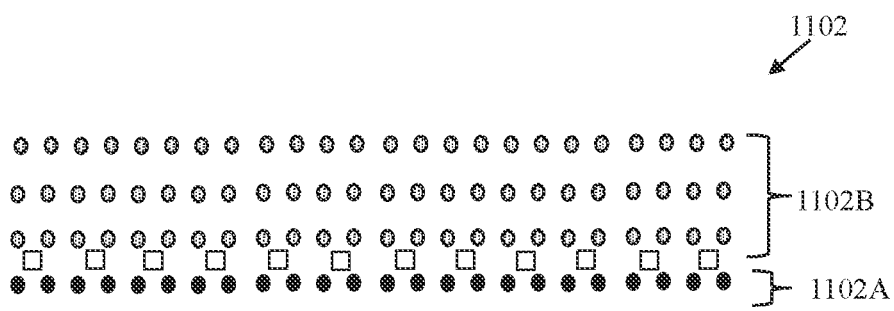
FIG. 11 is a diagram that illustrates an exemplary multi-range antenna array, in accordance with yet another embodiment of the disclosure.
Figures 12A, 12B:
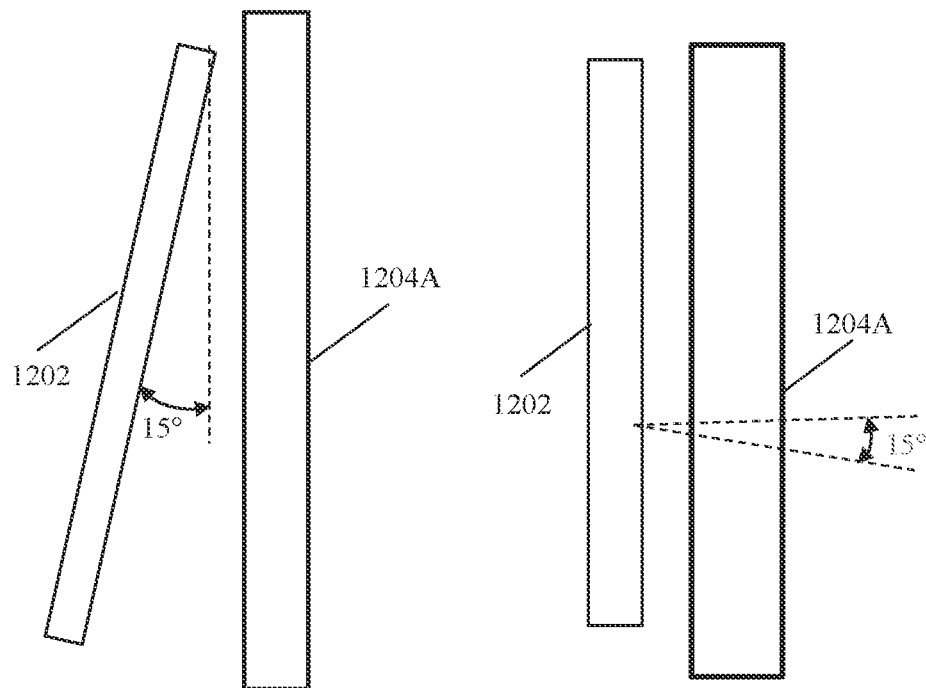
FIGS. 12A, 12B, 12C, and 12D are diagrams that illustrate different radome-based configurations of a repeater device, in accordance with various embodiments of the disclosure.
Figures 12C, 12D:
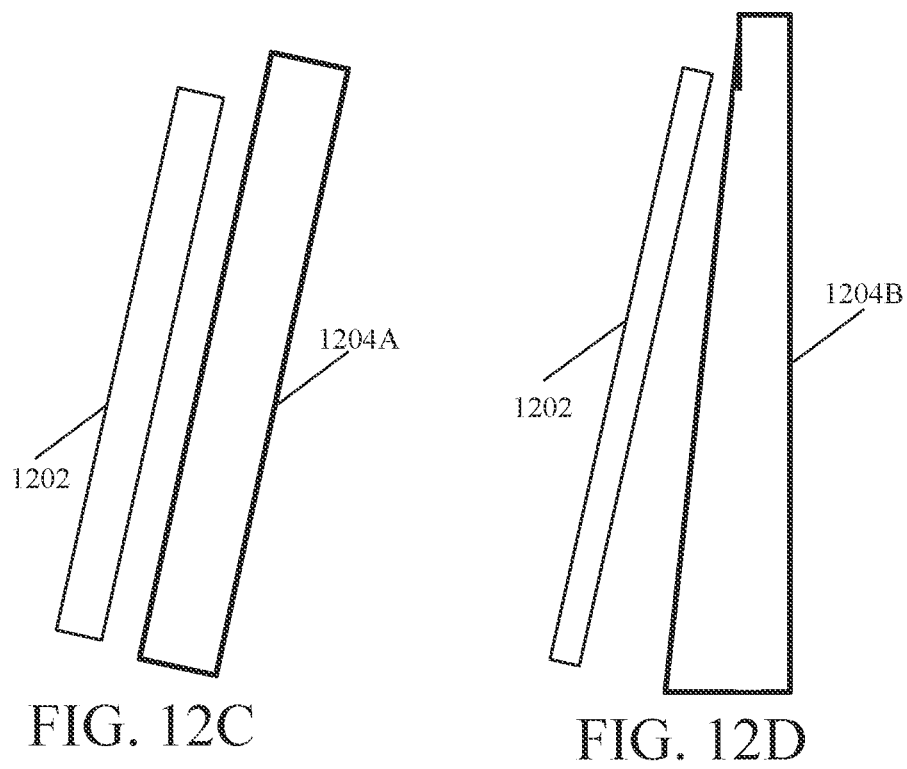

FIG. 11 is a diagram that illustrates an exemplary multi-range antenna array, in accordance with yet another embodiment of the disclosure. FIG. 11 is explained in conjunction with elements from FIGS. 1, 2, 3A, 3B, 4, 5A, 5B, 6A, 6B, 6C, 7A, 7B, 8, 9, and 10A to 10C. With reference to FIG. 11, there is shown a multi-range antenna array, such as a 4×24 antenna array 1102 with a different configuration of sub-arrays, such as a first sub-array 1102A and a second sub-array 1002B (e.g., a split-3 sub-array) with a first set of chips 1104 arranged between the first sub-array 1102A and the second sub-array 1002B.

FIGS. 12A, 12B, 12C, and 12D are diagrams that illustrate different radome-based configurations of a repeater device, in accordance with various embodiments of the disclosure. FIGS. 12A, 12B, 12C, and 12D are explained in conjunction with elements from FIGS. 1, 2, 3A, 3B, 4, 5A, 5B, 6A, 6B, 6C, 7A, 7B, 8, 9, and 10A to 10C, and 11. With reference to FIGS. 12A, 12B, 12C, and 12D, there is shown a repeater device 1202 arranged with respect to a radome at different angles or a different type of radome, such as a first radome 1204A and a second radome 1204B. The first radome 1204A may have a rectangular shape whereas the second radome 1204B may have a tapering shape with one side slanting and the other side straight, as shown in an example. In an example, the different types of radome that may be used includes but is not limited to an RF-wave transparent material-based thin radome (foam plastic plus a thin wall type), a plastic-based radome, or a sandwich-type plastic radome. The thin wall type radome may be considered thin relative to a wavelength frequency, and the sandwich-type may include two or more plastic skins with a dielectric core. In some implementations, the radome (e.g., the first radome 1204A or the second radome 1204B) may be used, whereas in some implementations, the radome may not be used depending on the need to protect the antenna array and different use case, for example, whether the repeater device 102 or 306 is ceiling-mounted, wall-mounted, deployed indoors or outdoors and whether there is any exposure to moisture, etc. at the deployed location.

Figure 13:
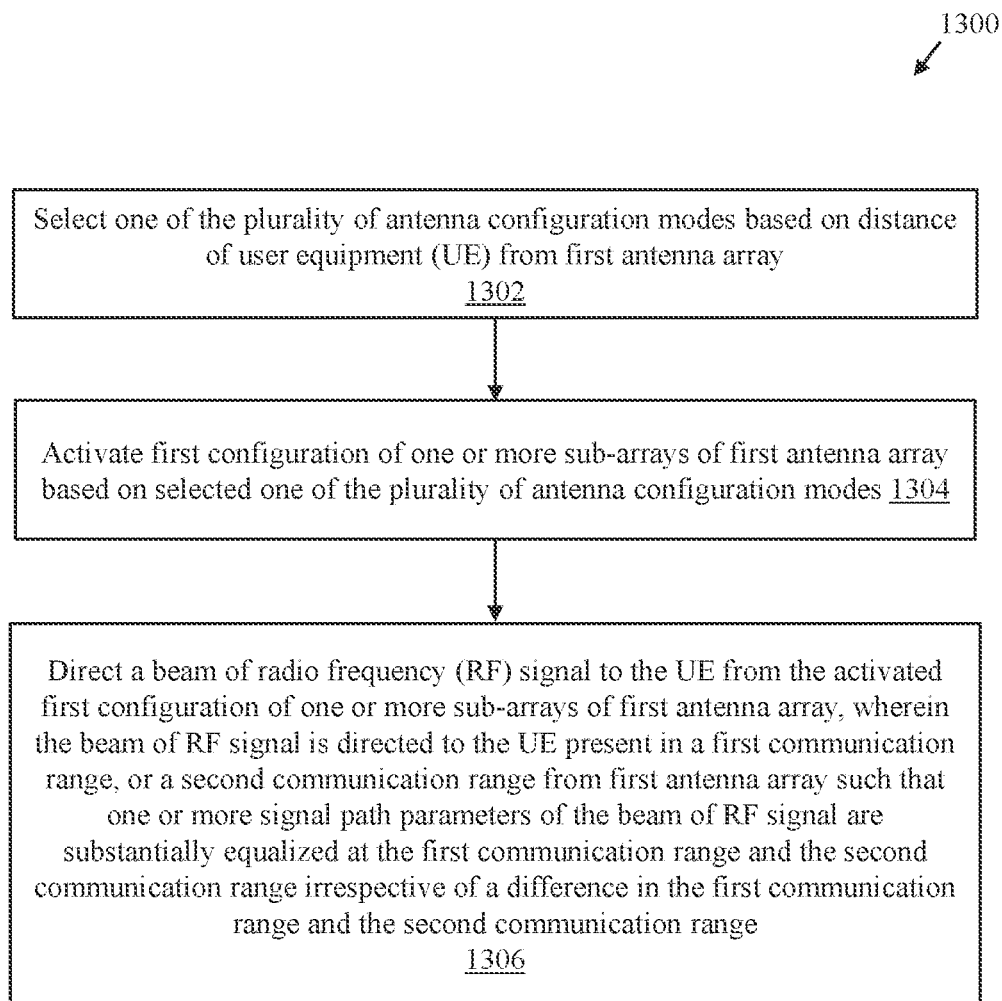
FIG. 13 is a flowchart that illustrates a method of operation of a repeater device for high-performance communication, in accordance with an embodiment of the disclosure.

FIG. 13 is a flowchart that illustrates a method of operation of a repeater device for high-performance communication, in accordance with an embodiment of the disclosure. FIG. 13 is explained in conjunction with elements from FIGS. 1, 2, 3A, 3B, 4, 5A, 5B, 6A, 6B, 6C, 7A, 7B, 8, 9, 10A to 10C, 11, and 12A to 12D. With reference to FIG. 13, there is shown a flowchart 1300 comprising exemplary operations 1302 through 1306.

At 1302, one of a plurality of antenna configuration modes (e.g., the plurality of antenna configuration modes 118 or the antenna configuration modes 304A to 304D) may be selected based on a distance of a UE (e.g., the UE 104) from a first antenna array (e.g., the first antenna array 106A or the antenna array 300) of the repeater device (e.g., the repeater device 102, 306, 702, or 1202). Other examples of the first antenna array may be the 4×4 antenna array 500A or 500B, the 4×12 antenna array 600A, the 4×8 antenna array 600B, the 4×6 antenna array 600C, the first antenna array 704A, the 4×24 antenna array 802, the 10×24 antenna array 902 or 1002, or the 4×24 antenna array 1102. In an implementation, the selection of the one of the plurality of antenna configuration modes (e.g., the plurality of antenna configuration modes 118 or the antenna configuration modes 304A to 304D) may be further based on an angle of the UE 104 with respect to the first antenna array (e.g., the first antenna array 106A or the antenna array 300) in addition to the distance of the UE 104 from the first antenna array.

In an example, the first antenna configuration mode 118A from the plurality of antenna configuration modes 118 may be selected when the UE 104 is at the first communication range 114A from the first antenna array 106A, where the first communication range 114A corresponds to a distance with respect to the first antenna array 106A that is greater than the second communication range 1148. In such a case, the beam of RF signal may be a pencil beam of RF signal directed from a combination of two or more sub-arrays of the first antenna array 106A to the UE 104 in the first communication range 114A and at a first angle from a reference plane. In another example, the second antenna configuration mode 1188 may be selected from the plurality of antenna configuration modes 118 when the UE 104 is near the first antenna array 106A in the second communication range 114B, where the second communication range 1148 corresponds to a distance with respect to the first antenna array 106A that is less than the first communication range 114A. In this case, the beam of RF signal may be a broad beam directed from the first sub-array 116A of the first antenna array 106A to the UE 104 in the second communication range 1148 and at a second angle from the reference plane, such as the ceiling surface plane 108.

At 1304, a first configuration of one or more sub-arrays of the first antenna array (e.g., the first antenna array 106A or the antenna array 300) may be activated based on the selected one of the plurality of antenna configuration modes (e.g., the plurality of antenna configuration modes 118 or the antenna configuration modes 304A to 304D). The first configuration of sub-arrays of the first antenna array (e.g., the first antenna array 106A or the antenna array 300) maybe is at least one of a single sub-array of the plurality of different sub-arrays or a combination of two or more sub-arrays of the plurality of different sub-arrays.

At 1306, a beam of radio frequency (RF) signal may be directed to the UE 104 from the activated first configuration of the one or more sub-arrays of the first antenna array (e.g., the first antenna array 106A or the antenna array 300). The beam of RF signal may be directed to the UE 104 present in a first communication range (e.g., the first communication range 114A or 312A or the communication range 312B) or a second communication range (e.g., the second communication range 114B or the communication ranges 314C or 314D of FIG. 3B) from the first antenna array such that one or more signal path parameters of the beam of RF signal are substantially equalized at the first communication range and the second communication range irrespective of a difference in the first communication range and the second communication range. The one or more signal path parameters corresponds to a path loss, an EIRP, an SNR ratio, and a throughput.

Various embodiments of the disclosure may provide a repeater device, for example, the repeater device 102, 306, 702, or 1202). The repeater device 102, 306, 702, or 1202 includes a first antenna array that comprises a plurality of antenna elements, where the plurality of antenna elements may be sectioned into a plurality of different sub-arrays. The first antenna array may further comprise a plurality of antenna configuration modes, wherein each antenna configuration mode of the plurality of antenna configuration modes defines a unique configuration of one or more sub-arrays of the plurality of different sub-arrays. The repeater device 102, 306, 702, or 1202 further includes the control circuitry 120 configured to select one of the plurality of antenna configuration modes based on a distance of a UE 104 from the first antenna array. The control circuitry 120 may be further configured to activate a first configuration of one or more sub-arrays of the first antenna array based on the selected one of the plurality of antenna configuration modes. The control circuitry 120 may be further configured to direct a beam of radio frequency (RF) signal to the UE 104 from the activated first configuration of the one or more sub-arrays of the first antenna array, where the beam of RF signal is directed to the UE 104 present in a first communication range, or a second communication range from the first antenna array such that one or more signal path parameters of the beam of RF signal are substantially equalized at the first communication range and the second communication range irrespective of a difference in the first communication range and the second communication range.

Various embodiments of the disclosure may provide a non-transitory computer-readable medium having stored thereon, computer-implemented instructions which when executed by a computer in a repeater device causes the repeater device to execute operations that may comprise selecting one of a plurality of antenna configuration modes based on a distance of a UE 104 from a first antenna array of the repeater device. The operations may further comprise activating a first configuration of one or more sub-arrays of the first antenna array based on the selected one of the plurality of antenna configuration modes. The operations may further comprise directing a beam of radio frequency (RF) signal to the UE 104 from the activated first configuration of the one or more sub-arrays of the first antenna array, where the beam of RF signal is directed to the UE present in a first communication range or a second communication range from the first antenna array such that one or more signal path parameters of the beam of RF signal are substantially equalized at the first communication range and the second communication range irrespective of a difference in the first communication range and the second communication range.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. A repeater device, comprising:
a first antenna array that comprises a plurality of antenna elements, wherein the plurality of antenna elements is sectioned into a plurality of different sub-arrays;
the first antenna array further comprises a plurality of antenna configuration modes, wherein each antenna configuration mode of the plurality of antenna configuration modes defines a unique configuration of one or more sub-arrays of the plurality of different sub-arrays; and
control circuitry configured to:
select one of the plurality of antenna configuration modes;
based on the selection of one of the plurality of antenna configuration modes, activate a first set of antenna elements of the first antenna array and deactivate a second set of antenna elements of the first antenna array, wherein the first set of antenna elements corresponds to a first configuration of one or more sub-arrays of the first antenna array; and
direct a beam of radio frequency (RF) signal to a user equipment (UE) from the first configuration of the one or more sub-arrays of the first antenna array.

2. The repeater device according to claim 1, wherein each of the unique configuration of the one or more sub-arrays comprises a different number of antenna elements.

3. The repeater device according to claim 1, wherein the first configuration of the one or more sub-arrays of the first antenna array is at least one of a single sub-array of the plurality of different sub-arrays or a combination of two or more sub-arrays of the plurality of different sub-arrays.

4. The repeater device according to claim 1, wherein the selection of the one of the plurality of antenna configuration modes is based on a distance of the UE from the first antenna array.

5. The repeater device according to claim 1, wherein the selection of the one of the plurality of antenna configuration modes is based on an angle of the UE with respect to the first antenna array.

6. The repeater device according to claim 1, wherein the first antenna array is arranged at an angle ranging from 5 to 35 degrees with respect to a reference plane.

7. The repeater device according to claim 6, wherein the reference plane is a ceiling surface plane, and wherein the first antenna array is a multi-range antenna array.

8. The repeater device according to claim 1, wherein the control circuitry is further configured to select a first antenna configuration mode from the plurality of antenna configuration modes when the UE is at a first communication range from the first antenna array, wherein the first communication range corresponds to a distance with respect to the first antenna array that is greater than a second communication range, and wherein the beam of RF signal is a pencil beam of RF signal directed from a combination of two or more sub-arrays of the first antenna array to the UE in the first communication range.

9. The repeater device according to claim 8, wherein the control circuitry is further configured to select a second antenna configuration mode from the plurality of antenna configuration modes when the UE is near the first antenna array in the second communication range, wherein the second communication range corresponds to a distance with respect to the first antenna array that is less than the first communication range.

10. The repeater device according to claim 1, wherein the repeater device is a ceiling-mounted 5G-enabled communication device or a wall-mounted 5G-enabled communication device.

11. A repeater device, comprising:
a first antenna array that comprises a plurality of antenna elements, wherein the plurality of antenna elements is sectioned into a plurality of different sub-arrays;
the first antenna array further comprises a plurality of antenna configuration modes,
wherein the plurality of antenna configuration modes comprises a first antenna configuration mode, a second antenna configuration mode, a third antenna configuration mode, and a fourth antenna configuration mode,
and wherein the fourth antenna configuration mode comprises a first sub-array of the first antenna array,
and wherein the third antenna configuration mode comprises the first sub-array and a second sub-array of the first antenna array,
and wherein the second antenna configuration mode comprises a combination of the first sub-array, the second sub-array, and a third sub-array of the first antenna array,
and wherein the first antenna configuration mode is a combination of the first sub-array, the second sub-array, and the third sub-array, and a fourth sub-array of the first sub-array; and
control circuitry configured to select the first antenna configuration mode, the second antenna configuration mode, the third antenna configuration mode, or the fourth antenna configuration mode when a user equipment (UE) is at a first communication range, a second communication range, a third communication range, or a fourth communication range, respectively, from the first antenna array.

12. The repeater device according to claim 11, wherein the control circuitry is further configured to activate the combination of the first sub-array, the second sub-array, and the third sub-array and deactivate the fourth sub-array when the second antenna configuration mode is selected.

13. The repeater device according to claim 11, wherein the control circuitry is further configured to activate the combination of the first sub-array and the second sub-array and deactivate the third sub-array and the fourth sub-array when the third antenna configuration mode is selected.

14. The repeater device according to claim 11, wherein the control circuitry is further configured to activate the first sub-array and deactivate the combination of the second sub-array, the third sub-array, and the fourth sub-array when the fourth antenna configuration mode is selected.

15. The repeater device according to claim 11, wherein the control circuitry is further configured to activate the combination of the first sub-array, the second sub-array, the third sub-array, and the fourth sub-array when the first antenna configuration mode is selected.

16. The repeater device according to claim 11, wherein the control circuitry is further configured to substantially equalize one or more signal path parameters irrespective of communication of a beam of radio frequency (RF) signal to the UE at different communication ranges.

17. The repeater device according to claim 11, wherein an elevation scan range of the first antenna configuration mode is less than the elevation scan range of the second antenna configuration mode, and wherein the elevation scan range of the third antenna configuration mode is less than the elevation scan range of the fourth antenna configuration mode.

18. The repeater device according to claim 11, wherein a gain and an effective isotropic radiated power (EIRP) of the first antenna configuration mode is greater than the gain and EIRP of the second antenna configuration mode, and wherein the gain and the EIRP of the third antenna configuration mode is greater than the gain and EIRP of the fourth antenna configuration mode.

19. The repeater device according to claim 11, wherein the repeater device is a ceiling-mounted 5G-enabled communication device or a wall-mounted 5G-enabled communication device, and wherein the first antenna array is a multi-range antenna array.

20. A method of operation of a repeater device, the method comprising:
selecting, by control circuitry of the repeater device, one of a plurality of antenna configuration modes;
activating, by the control circuitry, a first set of antenna elements of a first antenna array of the repeater device and deactivating a second set of antenna elements of the first antenna array based on the selection of one of the plurality of antenna configuration modes, wherein the first set of antenna elements corresponds to a first configuration of one or more sub-arrays of the first antenna array; and
directing, by the control circuitry, a beam of radio frequency (RF) signal to a user equipment (UE) from the first configuration of the one or more sub-arrays of the first antenna array.

\* \* \* \* \*